(12) United States Patent
Oehring et al.

(10) Patent No.: US 11,067,481 B2
(45) Date of Patent: Jul. 20, 2021

(54) INSTRUMENTED FRACTURING SLURRY FLOW SYSTEM AND METHOD

(71) Applicant: U.S. Well Services, LLC, Houston, TX (US)

(72) Inventors: Jared Oehring, Houston, TX (US); Alexander James Christinzio, Morgantown, WV (US); Brandon N. Hinderliter, Houston, TX (US)

(73) Assignee: U.S. Well Services, LLC, Houston, TX (US)

( * ) Notice: Subject to any disclaimer, the term of this patent is extended or adjusted under 35 U.S.C. 154(b) by 0 days.

(21) Appl. No.: 16/152,695

(22) Filed: Oct. 5, 2018

(65) Prior Publication Data
US 2019/0107466 A1 Apr. 11, 2019

Related U.S. Application Data

(60) Provisional application No. 62/568,716, filed on Oct. 5, 2017.

(51) Int. Cl.
*E21B 43/26* (2006.01)
*G01M 99/00* (2011.01)

(52) U.S. Cl.
CPC .......... *G01M 99/005* (2013.01); *E21B 43/26* (2013.01); *E21B 43/2607* (2020.05)

(58) Field of Classification Search
CPC ...... E21B 43/26; E21B 47/10; E21B 43/2607; G01M 99/005
See application file for complete search history.

(56) References Cited

U.S. PATENT DOCUMENTS

| 1,656,861 | A | 1/1928 | Leonard |
|---|---|---|---|
| 1,671,436 | A | 5/1928 | Melott |
| 2,004,077 | A | 6/1935 | McCartney |
| 2,183,364 | A | 12/1939 | Bailey |
| 2,220,622 | A | 11/1940 | Aitken |
| 2,248,051 | A | 7/1941 | Armstrong |

(Continued)

FOREIGN PATENT DOCUMENTS

| AU | 2007340913 | 7/2008 |
|---|---|---|
| CA | 2406801 | 11/2001 |

(Continued)

OTHER PUBLICATIONS

International Search Report and Written Opinion dated Jan. 2, 2020 in related PCT Application No. PCT/US19/55325.

(Continued)

*Primary Examiner* — Brad Harcourt
(74) *Attorney, Agent, or Firm* — Hogan Lovells US LLP

(57) ABSTRACT

Embodiments include a method for monitoring a fracturing operation that includes positioning a pump at a well site where fracturing operations are being conducted. The method also includes arranging one or more sensors at at least one of a pump inlet or a pump outlet, the one or more sensors monitoring a flow rate of a slurry. The method includes receiving flow data from the one or more sensors. The method also includes determining a pump efficiency, based at least in part on the flow data, is below a threshold. The method further includes adjusting one or more operating parameters of the pump.

13 Claims, 9 Drawing Sheets

(56) References Cited

U.S. PATENT DOCUMENTS

| | | |
|---|---|---|
| 2,407,796 A | 9/1946 | Page |
| 2,416,848 A | 3/1947 | Rothery |
| 2,610,741 A | 9/1952 | Schmid |
| 2,753,940 A | 7/1956 | Bonner |
| 3,055,682 A | 9/1962 | Bacher |
| 3,061,039 A | 10/1962 | Peters |
| 3,066,503 A | 12/1962 | Fleming |
| 3,302,069 A | 1/1967 | Webster |
| 3,334,495 A | 8/1967 | Jensen |
| 3,722,595 A | 3/1973 | Kiel |
| 3,764,233 A | 10/1973 | Strickland |
| 3,773,140 A | 11/1973 | Mahajan |
| 3,837,179 A | 9/1974 | Barth |
| 3,849,662 A | 11/1974 | Blaskowski |
| 3,878,884 A | 4/1975 | Raleigh |
| 3,881,551 A | 5/1975 | Terry |
| 4,037,431 A | 7/1977 | Sugimoto |
| 4,100,822 A | 7/1978 | Rosman |
| 4,151,575 A | 4/1979 | Hogue |
| 4,226,299 A | 10/1980 | Hansen |
| 4,265,266 A | 5/1981 | Kierbow et al. |
| 4,432,064 A | 2/1984 | Barker |
| 4,442,665 A | 4/1984 | Fick et al. |
| 4,456,092 A | 6/1984 | Kubozuka |
| 4,506,982 A | 3/1985 | Smithers et al. |
| 4,512,387 A | 4/1985 | Rodriguez |
| 4,529,887 A | 7/1985 | Johnson |
| 4,538,916 A | 9/1985 | Zimmerman |
| 4,676,063 A | 6/1987 | Goebel et al. |
| 4,759,674 A | 7/1988 | Schroder |
| 4,793,386 A | 12/1988 | Sloan |
| 4,845,981 A | 7/1989 | Pearson |
| 4,922,463 A | 5/1990 | Del Zotto et al. |
| 5,004,400 A | 4/1991 | Handke |
| 5,006,044 A | 4/1991 | Walker, Sr. |
| 5,025,861 A | 6/1991 | Huber |
| 5,050,673 A | 9/1991 | Baldridge |
| 5,114,239 A | 5/1992 | Allen |
| 5,130,628 A | 7/1992 | Owen |
| 5,131,472 A | 7/1992 | Dees et al. |
| 5,172,009 A | 12/1992 | Mohan |
| 5,189,388 A | 2/1993 | Mosley |
| 5,230,366 A | 7/1993 | Marandi |
| 5,366,324 A | 11/1994 | Arlt |
| 5,422,550 A | 6/1995 | McClanahan |
| 5,433,243 A | 7/1995 | Griswold |
| 5,439,066 A | 8/1995 | Gipson |
| 5,517,822 A | 5/1996 | Haws et al. |
| 5,548,093 A | 8/1996 | Sato |
| 5,590,976 A | 1/1997 | Kilheffer et al. |
| 5,655,361 A | 8/1997 | Kishi |
| 5,736,838 A | 4/1998 | Dove et al. |
| 5,755,096 A | 5/1998 | Holleyman |
| 5,790,972 A | 8/1998 | Kohlenberger |
| 5,865,247 A | 2/1999 | Paterson |
| 5,879,137 A | 3/1999 | Yie |
| 5,894,888 A | 4/1999 | Wiemers |
| 5,907,970 A | 6/1999 | Havlovick et al. |
| 5,950,726 A | 9/1999 | Roberts |
| 6,097,310 A | 8/2000 | Harrell et al. |
| 6,138,764 A | 10/2000 | Scarsdale et al. |
| 6,142,878 A | 11/2000 | Barin |
| 6,164,910 A | 12/2000 | Mayleben |
| 6,202,702 B1 | 3/2001 | Ohira |
| 6,208,098 B1 | 3/2001 | Kume |
| 6,254,462 B1 | 7/2001 | Kelton |
| 6,271,637 B1 | 8/2001 | Kushion |
| 6,273,193 B1 | 8/2001 | Hermann |
| 6,315,523 B1 | 11/2001 | Mills |
| 6,477,852 B2 | 11/2002 | Dodo |
| 6,484,490 B1 | 11/2002 | Olsen |
| 6,491,098 B1 | 12/2002 | Dallas |
| 6,529,135 B1 | 3/2003 | Bowers et al. |
| 6,626,646 B2 | 9/2003 | Rajewski |
| 6,719,900 B2 | 4/2004 | Hawkins |
| 6,765,304 B2 | 7/2004 | Baten et al. |
| 6,776,227 B2 | 8/2004 | Beida |
| 6,802,690 B2 | 10/2004 | Plan |
| 6,808,303 B2 | 10/2004 | Fisher |
| 6,931,310 B2 | 8/2005 | Shimizu et al. |
| 6,936,947 B1 | 8/2005 | Leijon |
| 6,985,750 B1 | 1/2006 | Vicknair et al. |
| 7,082,993 B2 | 8/2006 | Ayoub |
| 7,104,233 B2 | 9/2006 | Ryczek et al. |
| 7,170,262 B2 | 1/2007 | Pettigrew |
| 7,173,399 B2 | 2/2007 | Sihler |
| 7,308,933 B1 | 12/2007 | Mayfield |
| 7,312,593 B1 | 12/2007 | Streicher et al. |
| 7,336,514 B2 | 2/2008 | Amarillas |
| 7,445,041 B2 | 11/2008 | O'Brien |
| 7,494,263 B2 | 2/2009 | Dykstra et al. |
| 7,500,642 B2 | 3/2009 | Cunningham |
| 7,525,264 B2 | 4/2009 | Dodge |
| 7,563,076 B2 | 7/2009 | Brunet |
| 7,581,379 B2 | 9/2009 | Yoshida |
| 7,675,189 B2 | 3/2010 | Grenier |
| 7,683,499 B2 | 3/2010 | Saucier |
| 7,717,193 B2 | 5/2010 | Egilsson et al. |
| 7,755,310 B2 | 7/2010 | West et al. |
| 7,807,048 B2 | 10/2010 | Collette |
| 7,835,140 B2 | 11/2010 | Mori |
| 7,845,413 B2 | 12/2010 | Shampine et al. |
| 7,926,562 B2 | 4/2011 | Poitzsch |
| 7,894,757 B2 | 7/2011 | Keast |
| 7,977,824 B2 | 7/2011 | Halen et al. |
| 8,037,936 B2 | 10/2011 | Neuroth |
| 8,054,084 B2 | 11/2011 | Schulz et al. |
| 8,083,504 B2 | 12/2011 | Williams |
| 8,091,928 B2 | 1/2012 | Carrier |
| 8,096,354 B2 | 1/2012 | Poitzsch |
| 8,096,891 B2 | 1/2012 | Lochtefeld |
| 8,139,383 B2 | 3/2012 | Efraimsson |
| 8,146,665 B2 | 4/2012 | Neal |
| 8,154,419 B2 | 4/2012 | Daussin et al. |
| 8,232,892 B2 | 7/2012 | Overholt et al. |
| 8,261,528 B2 | 9/2012 | Chillar |
| 8,272,439 B2 | 9/2012 | Strickland |
| 8,310,272 B2 | 11/2012 | Quarto |
| 8,354,817 B2 | 1/2013 | Yeh et al. |
| 8,474,521 B2 | 7/2013 | Kajaria |
| 8,506,267 B2 | 8/2013 | Gambier et al. |
| 8,534,235 B2 | 9/2013 | Chandler |
| 8,573,303 B2 | 11/2013 | Kerfoot |
| 8,596,056 B2 | 12/2013 | Woodmansee |
| 8,616,005 B1 | 12/2013 | Cousino |
| 8,616,274 B2 | 12/2013 | Belcher et al. |
| 8,646,521 B2 | 2/2014 | Bowen |
| 8,692,408 B2 | 4/2014 | Zhang et al. |
| 8,727,068 B2 | 5/2014 | Bruin |
| 8,760,657 B2 | 6/2014 | Pope |
| 8,763,387 B2 | 7/2014 | Schmidt |
| 8,774,972 B2 | 7/2014 | Rusnak |
| 8,789,601 B2 | 7/2014 | Broussard |
| 8,795,525 B2 | 8/2014 | McGinnis et al. |
| 8,800,652 B2 | 8/2014 | Bartko |
| 8,807,960 B2 | 8/2014 | Stephenson |
| 8,838,341 B2 | 9/2014 | Kumano |
| 8,851,860 B1 | 10/2014 | Mail |
| 8,857,506 B2 | 10/2014 | Stone, Jr. |
| 8,899,940 B2 | 12/2014 | Laugemors |
| 8,905,056 B2 | 12/2014 | Kendrick |
| 8,905,138 B2 | 12/2014 | Lundstedt et al. |
| 8,997,904 B2 | 4/2015 | Cryer |
| 9,018,881 B2 | 4/2015 | Mao et al. |
| 9,051,822 B2 | 6/2015 | Ayan |
| 9,051,923 B2 | 6/2015 | Kuo |
| 9,061,223 B2 | 6/2015 | Winborn |
| 9,062,545 B2 | 6/2015 | Roberts et al. |
| 9,067,182 B2 | 6/2015 | Nichols |
| 9,103,193 B2 | 8/2015 | Coli |
| 9,119,326 B2 | 8/2015 | McDonnell |
| 9,121,257 B2 | 9/2015 | Coli et al. |
| 9,140,110 B2 | 9/2015 | Coli et al. |
| 9,160,168 B2 | 10/2015 | Chapel |

(56) References Cited

U.S. PATENT DOCUMENTS

| | | |
|---|---|---|
| 9,175,554 B1 | 11/2015 | Watson |
| 9,206,684 B2 | 12/2015 | Parra |
| 9,260,253 B2 | 2/2016 | Naizer |
| 9,322,239 B2 | 4/2016 | Angeles Boza et al. |
| 9,324,049 B2 | 4/2016 | Thomeer |
| 9,340,353 B2 | 5/2016 | Oren |
| 9,366,114 B2 | 6/2016 | Coli et al. |
| 9,410,410 B2 | 8/2016 | Broussard et al. |
| 9,450,385 B2 | 9/2016 | Kristensen |
| 9,458,687 B2 | 10/2016 | Hallundbaek |
| 9,475,020 B2 | 10/2016 | Coli et al. |
| 9,475,021 B2 | 10/2016 | Coli et al. |
| 9,482,086 B2 | 11/2016 | Richardson et al. |
| 9,499,335 B2 | 11/2016 | McIver |
| 9,506,333 B2 | 11/2016 | Castillo et al. |
| 9,513,055 B1 | 12/2016 | Seal |
| 9,534,473 B2 | 1/2017 | Morris et al. |
| 9,562,420 B2 | 2/2017 | Morris et al. |
| 9,587,649 B2 | 3/2017 | Oehring |
| 9,611,728 B2 | 4/2017 | Oehring |
| 9,650,871 B2 | 5/2017 | Oehring et al. |
| 9,650,879 B2 | 5/2017 | Broussard et al. |
| 9,706,185 B2 | 7/2017 | Ellis |
| 9,728,354 B2 | 8/2017 | Skolozdra |
| 9,738,461 B2 | 8/2017 | DeGaray |
| 9,739,546 B2 | 8/2017 | Bertilsson et al. |
| 9,745,840 B2 | 8/2017 | Oehring et al. |
| 9,840,901 B2 | 12/2017 | Oehring et al. |
| 9,863,228 B2 | 1/2018 | Shampine et al. |
| 9,893,500 B2 | 2/2018 | Oehring |
| 9,909,398 B2 | 3/2018 | Pham |
| 9,915,128 B2 | 3/2018 | Hunter |
| 9,932,799 B2 | 4/2018 | Symchuk |
| 9,963,961 B2 | 5/2018 | Hardin |
| 9,970,278 B2 | 5/2018 | Broussard |
| 9,976,351 B2 | 5/2018 | Randall |
| 9,995,218 B2 | 6/2018 | Oehring |
| 10,008,880 B2 | 6/2018 | Vicknair |
| 10,020,711 B2 | 7/2018 | Oehring |
| 10,036,238 B2 | 7/2018 | Oehring |
| 10,107,086 B2 | 10/2018 | Oehring |
| 10,119,381 B2 | 11/2018 | Oehring |
| 10,184,465 B2 | 1/2019 | Enis et al. |
| 10,196,878 B2 | 2/2019 | Hunter |
| 10,221,639 B2 | 3/2019 | Romer et al. |
| 10,227,854 B2 | 3/2019 | Glass |
| 10,232,332 B2 | 3/2019 | Oehring |
| 10,246,984 B2 | 4/2019 | Payne |
| 10,254,732 B2 | 4/2019 | Oehring |
| 10,260,327 B2 | 4/2019 | Kajaria |
| 10,280,724 B2 | 5/2019 | Hinderliter |
| 10,287,873 B2 | 5/2019 | Filas |
| 10,302,079 B2 | 5/2019 | Kendrick |
| 10,309,205 B2 | 6/2019 | Randall |
| 10,337,308 B2 | 7/2019 | Broussard |
| 10,371,012 B2 | 8/2019 | Davis |
| 10,378,326 B2 | 8/2019 | Morris |
| 10,393,108 B2 | 8/2019 | Chong |
| 10,407,990 B2 | 9/2019 | Oehring |
| 10,408,030 B2 | 9/2019 | Oehring et al. |
| 10,408,031 B2 | 9/2019 | Oehring et al. |
| 10,415,332 B2 | 9/2019 | Morris |
| 10,436,026 B2 | 10/2019 | Ounadjela |
| 10,627,003 B2 | 4/2020 | Dale et al. |
| 10,669,471 B2 | 6/2020 | Schmidt et al. |
| 10,669,804 B2 | 6/2020 | Kotrla |
| 10,695,950 B2 | 6/2020 | Igo et al. |
| 10,711,576 B2 | 7/2020 | Bishop |
| 10,740,730 B2 | 8/2020 | Altamirano et al. |
| 2001/0000996 A1 | 5/2001 | Grirwand et al. |
| 2002/0169523 A1 | 11/2002 | Ross et al. |
| 2003/0079875 A1 | 1/2003 | Weng |
| 2003/0056514 A1 | 3/2003 | Lohn |
| 2003/0138327 A1 | 7/2003 | Jones et al. |
| 2004/0040746 A1 | 3/2004 | Niedermayr |
| 2004/0102109 A1 | 5/2004 | Crafty et al. |
| 2004/0167738 A1 | 8/2004 | Miller |
| 2005/0061548 A1 | 3/2005 | Hooper |
| 2005/0116541 A1 | 6/2005 | Seiver |
| 2005/0201197 A1 | 9/2005 | Dueli et al. |
| 2005/0274508 A1 | 12/2005 | Folk |
| 2006/0052903 A1 | 3/2006 | Bassett |
| 2006/0065319 A1 | 3/2006 | Csitari |
| 2006/0109141 A1 | 5/2006 | Huang |
| 2006/0260331 A1 | 11/2006 | Andreychuk |
| 2007/0131410 A1 | 6/2007 | Hill |
| 2007/0187163 A1 | 8/2007 | Cone |
| 2007/0201305 A1 | 8/2007 | Heilman et al. |
| 2007/0226089 A1 | 9/2007 | DeGaray et al. |
| 2007/0277982 A1 | 12/2007 | Shampine |
| 2007/0278140 A1 | 12/2007 | Mallet et al. |
| 2008/0017369 A1 | 1/2008 | Sarada |
| 2008/0041596 A1 | 2/2008 | Blount |
| 2008/0095644 A1 | 4/2008 | Mantel et al. |
| 2008/0112802 A1 | 5/2008 | Orlando |
| 2008/0137266 A1 | 6/2008 | Jensen |
| 2008/0164023 A1 | 7/2008 | Dykstra et al. |
| 2008/0208478 A1 | 8/2008 | Ella et al. |
| 2008/0217024 A1 | 9/2008 | Moore |
| 2008/0236818 A1 | 10/2008 | Dykstra |
| 2008/0257449 A1 | 10/2008 | Weinstein et al. |
| 2008/0264625 A1 | 10/2008 | Ochoa |
| 2008/0264640 A1 | 10/2008 | Eslinger |
| 2008/0264649 A1 | 10/2008 | Crawford |
| 2008/0277120 A1 | 11/2008 | Hickie |
| 2009/0045782 A1 | 2/2009 | Datta |
| 2009/0065299 A1 | 3/2009 | Vito |
| 2009/0078410 A1 | 3/2009 | Krenek et al. |
| 2009/0090504 A1 | 4/2009 | Weightman |
| 2009/0093317 A1 | 4/2009 | Kajiwara et al. |
| 2009/0095482 A1 | 4/2009 | Surjaatmadja |
| 2009/0145611 A1 | 6/2009 | Pallini, Jr. |
| 2009/0153354 A1 | 6/2009 | Daussin et al. |
| 2009/0188181 A1 | 7/2009 | Forbis |
| 2009/0200035 A1 | 8/2009 | Bjerkreim et al. |
| 2009/0260826 A1 | 10/2009 | Sherwood |
| 2009/0308602 A1 | 12/2009 | Bruins et al. |
| 2010/0000508 A1 | 1/2010 | Chandler |
| 2010/0019574 A1 | 1/2010 | Baldassarre et al. |
| 2010/0038907 A1 | 2/2010 | Hunt |
| 2010/0045109 A1 | 2/2010 | Arnold |
| 2010/0051272 A1 | 3/2010 | Loree et al. |
| 2010/0101785 A1 | 4/2010 | Khvoshchev |
| 2010/0132949 A1 | 6/2010 | DeFosse et al. |
| 2010/0146981 A1 | 6/2010 | Motakef |
| 2010/0172202 A1 | 7/2010 | Borgstadt |
| 2010/0200224 A1 | 8/2010 | Nguete |
| 2010/0250139 A1 | 9/2010 | Hobbs et al. |
| 2010/0293973 A1 | 11/2010 | Erickson |
| 2010/0303655 A1 | 12/2010 | Scekic |
| 2010/0322802 A1 | 12/2010 | Kugelev |
| 2011/0005757 A1 | 1/2011 | Hebert |
| 2011/0017468 A1 | 1/2011 | Birch et al. |
| 2011/0052423 A1 | 3/2011 | Gambier et al. |
| 2011/0061855 A1 | 3/2011 | Case et al. |
| 2011/0081268 A1 | 4/2011 | Ochoa et al. |
| 2011/0085924 A1 | 4/2011 | Shampine |
| 2011/0110793 A1 | 5/2011 | Leugemores et al. |
| 2011/0166046 A1 | 7/2011 | Weaver |
| 2011/0247878 A1 | 10/2011 | Rasheed |
| 2011/0272158 A1 | 11/2011 | Neal |
| 2012/0018016 A1 | 1/2012 | Gibson |
| 2012/0049625 A1 | 3/2012 | Hopwood |
| 2012/0063936 A1 | 3/2012 | Baxter et al. |
| 2012/0085541 A1 | 4/2012 | Love et al. |
| 2012/0127635 A1 | 5/2012 | Grindeland |
| 2012/0150455 A1 | 6/2012 | Franklin et al. |
| 2012/0152716 A1 | 6/2012 | Kikukawa et al. |
| 2012/0205301 A1 | 8/2012 | McGuire et al. |
| 2012/0205400 A1 | 8/2012 | DeGaray et al. |
| 2012/0222865 A1 | 9/2012 | Larson |
| 2012/0232728 A1 | 9/2012 | Karimi et al. |
| 2012/0247783 A1 | 10/2012 | Berner, Jr. |
| 2012/0255734 A1 | 10/2012 | Coli et al. |

(56) References Cited

U.S. PATENT DOCUMENTS

| | | |
|---|---|---|
| 2013/0009469 A1 | 1/2013 | Gillett |
| 2013/0025706 A1 | 1/2013 | DeGaray et al. |
| 2013/0175038 A1 | 7/2013 | Conrad |
| 2013/0175039 A1 | 7/2013 | Guidry |
| 2013/0180722 A1 | 7/2013 | Olarte Caro et al. |
| 2013/0189629 A1 | 7/2013 | Chandler |
| 2013/0199617 A1 | 8/2013 | DeGaray et al. |
| 2013/0233542 A1 | 9/2013 | Shampine |
| 2013/0255271 A1 | 10/2013 | Yu et al. |
| 2013/0284278 A1 | 10/2013 | Winborn |
| 2013/0284455 A1 | 10/2013 | Kajaria et al. |
| 2013/0299167 A1 | 11/2013 | Fordyce et al. |
| 2013/0306322 A1 | 11/2013 | Sanborn |
| 2013/0317750 A1 | 11/2013 | Hunter |
| 2013/0341029 A1 | 12/2013 | Roberts et al. |
| 2013/0343858 A1 | 12/2013 | Flusche |
| 2014/0000899 A1 | 1/2014 | Nevison |
| 2014/0010671 A1 | 1/2014 | Cryer et al. |
| 2014/0054965 A1 | 2/2014 | Jain |
| 2014/0060658 A1 | 3/2014 | Hains |
| 2014/0095114 A1 | 4/2014 | Thomeer |
| 2014/0096974 A1 | 4/2014 | Coli |
| 2014/0124162 A1 | 5/2014 | Leavitt |
| 2014/0138079 A1 | 5/2014 | Broussard |
| 2014/0174717 A1 | 6/2014 | Broussard et al. |
| 2014/0219824 A1 | 8/2014 | Burnette |
| 2014/0238683 A1 | 8/2014 | Korach |
| 2014/0246211 A1 | 9/2014 | Guidry et al. |
| 2014/0251623 A1 | 9/2014 | Lestz et al. |
| 2014/0255214 A1 | 9/2014 | Burnette |
| 2014/0277772 A1 | 9/2014 | Lopez |
| 2014/0290768 A1 | 10/2014 | Randle |
| 2014/0379300 A1* | 12/2014 | Devine .................. F04B 51/00 702/182 |
| 2015/0027712 A1 | 1/2015 | Vicknair |
| 2015/0053426 A1 | 2/2015 | Smith |
| 2015/0068724 A1 | 3/2015 | Coli et al. |
| 2015/0068754 A1 | 3/2015 | Coli et al. |
| 2015/0075778 A1 | 3/2015 | Walters |
| 2015/0083426 A1 | 3/2015 | Lesko |
| 2015/0097504 A1 | 4/2015 | Lamascus |
| 2015/0114652 A1 | 4/2015 | Lestz |
| 2015/0136043 A1 | 5/2015 | Shaaban |
| 2015/0144336 A1 | 5/2015 | Hardin et al. |
| 2015/0147194 A1 | 5/2015 | Foote |
| 2015/0159911 A1 | 6/2015 | Holt |
| 2015/0175013 A1 | 6/2015 | Cryer et al. |
| 2015/0176386 A1 | 6/2015 | Castillo et al. |
| 2015/0211512 A1 | 7/2015 | Wiegman |
| 2015/0211524 A1 | 7/2015 | Broussard |
| 2015/0217672 A1 | 8/2015 | Shampine |
| 2015/0225113 A1 | 8/2015 | Lungu |
| 2015/0233530 A1 | 8/2015 | Sandidge |
| 2015/0252661 A1 | 9/2015 | Glass |
| 2015/0300145 A1 | 10/2015 | Coli et al. |
| 2015/0300336 A1 | 10/2015 | Hernandez et al. |
| 2015/0314225 A1 | 11/2015 | Coli et al. |
| 2015/0330172 A1 | 11/2015 | Allmaras |
| 2015/0354322 A1 | 12/2015 | Vicknair |
| 2016/0032703 A1 | 2/2016 | Broussard et al. |
| 2016/0102537 A1 | 4/2016 | Lopez |
| 2016/0105022 A1 | 4/2016 | Oehring |
| 2016/0160889 A1 | 6/2016 | Hoffman et al. |
| 2016/0177675 A1 | 6/2016 | Morris et al. |
| 2016/0177678 A1 | 6/2016 | Morris |
| 2016/0186531 A1 | 6/2016 | Harkless et al. |
| 2016/0208592 A1 | 7/2016 | Oehring |
| 2016/0208593 A1 | 7/2016 | Coli et al. |
| 2016/0208594 A1 | 7/2016 | Coli et al. |
| 2016/0208595 A1 | 7/2016 | Tang |
| 2016/0221220 A1 | 8/2016 | Paige |
| 2016/0230524 A1 | 8/2016 | Dumoit |
| 2016/0230525 A1 | 8/2016 | Lestz et al. |
| 2016/0258267 A1 | 9/2016 | Payne |
| 2016/0265457 A1 | 9/2016 | Stephenson |
| 2016/0273328 A1 | 9/2016 | Oehring |
| 2016/0273456 A1 | 9/2016 | Zhang et al. |
| 2016/0281484 A1 | 9/2016 | Lestz |
| 2016/0290114 A1 | 10/2016 | Oehring |
| 2016/0290563 A1 | 10/2016 | Diggins |
| 2016/0312108 A1 | 10/2016 | Lestz et al. |
| 2016/0319650 A1 | 11/2016 | Oehring |
| 2016/0326853 A1 | 11/2016 | Fred et al. |
| 2016/0326854 A1 | 11/2016 | Broussard |
| 2016/0326855 A1 | 11/2016 | Coli et al. |
| 2016/0341281 A1 | 11/2016 | Brunvold et al. |
| 2016/0348479 A1 | 12/2016 | Oehring |
| 2016/0349728 A1 | 12/2016 | Oehring |
| 2016/0369609 A1 | 12/2016 | Morris et al. |
| 2017/0016433 A1 | 1/2017 | Chong |
| 2017/0021318 A1 | 1/2017 | McIver et al. |
| 2017/0022788 A1 | 1/2017 | Oehring et al. |
| 2017/0022807 A1 | 1/2017 | Dursun |
| 2017/0028368 A1 | 2/2017 | Oehring et al. |
| 2017/0030177 A1 | 2/2017 | Oehring |
| 2017/0030178 A1 | 2/2017 | Oehring et al. |
| 2017/0036178 A1 | 2/2017 | Coli et al. |
| 2017/0036872 A1 | 2/2017 | Wallace |
| 2017/0037717 A1 | 2/2017 | Oehring |
| 2017/0037718 A1 | 2/2017 | Coli et al. |
| 2017/0043280 A1 | 2/2017 | Vankouwenberg |
| 2017/0051732 A1 | 2/2017 | Hemandez et al. |
| 2017/0074076 A1 | 3/2017 | Joseph et al. |
| 2017/0082033 A1 | 3/2017 | Wu et al. |
| 2017/0096885 A1 | 4/2017 | Oehring |
| 2017/0096889 A1 | 4/2017 | Blanckaert et al. |
| 2017/0104389 A1 | 4/2017 | Morris et al. |
| 2017/0114625 A1 | 4/2017 | Norris |
| 2017/0130743 A1 | 5/2017 | Anderson |
| 2017/0138171 A1 | 5/2017 | Richards et al. |
| 2017/0145918 A1 | 5/2017 | Oehring |
| 2017/0146189 A1 | 5/2017 | Herman |
| 2017/0159570 A1 | 6/2017 | Bickert |
| 2017/0159654 A1 | 6/2017 | Kendrick |
| 2017/0175516 A1 | 6/2017 | Eslinger |
| 2017/0204852 A1 | 7/2017 | Barnett |
| 2017/0212535 A1 | 7/2017 | Shelman et al. |
| 2017/0218727 A1 | 8/2017 | Oehring |
| 2017/0218843 A1 | 8/2017 | Oehring |
| 2017/0222409 A1 | 8/2017 | Oehring |
| 2017/0226838 A1 | 8/2017 | Ceizobka et al. |
| 2017/0226839 A1 | 8/2017 | Broussard |
| 2017/0226842 A1* | 8/2017 | Omont .................... E21B 33/13 |
| 2017/0234250 A1 | 8/2017 | Janik |
| 2017/0241221 A1 | 8/2017 | Seshadri |
| 2017/0259227 A1 | 9/2017 | Morris et al. |
| 2017/0292513 A1 | 10/2017 | Haddad |
| 2017/0313499 A1 | 11/2017 | Hughes et al. |
| 2017/0314380 A1 | 11/2017 | Oehring |
| 2017/0314979 A1* | 11/2017 | Ye ............................ E21B 21/08 |
| 2017/0328179 A1 | 11/2017 | Dykstra |
| 2017/0369258 A1 | 12/2017 | DeGaray |
| 2017/0370639 A1 | 12/2017 | Barden et al. |
| 2018/0028992 A1 | 2/2018 | Stegemoeller |
| 2018/0038216 A1 | 2/2018 | Zhang |
| 2018/0045331 A1 | 2/2018 | Lopez |
| 2018/0090914 A1 | 3/2018 | Johnson et al. |
| 2018/0156210 A1 | 6/2018 | Oehring |
| 2018/0181830 A1 | 6/2018 | Luharuka et al. |
| 2018/0183219 A1 | 6/2018 | Oehring |
| 2018/0216455 A1 | 8/2018 | Andreychuk |
| 2018/0238147 A1 | 8/2018 | Shahri |
| 2018/0245428 A1 | 8/2018 | Richards |
| 2018/0258746 A1 | 9/2018 | Broussard |
| 2018/0259080 A1 | 9/2018 | Dale et al. |
| 2018/0266217 A1 | 9/2018 | Funkhauser et al. |
| 2018/0266412 A1 | 9/2018 | Stokkevag |
| 2018/0274446 A1 | 9/2018 | Oehring |
| 2018/0284817 A1 | 10/2018 | Cook et al. |
| 2018/0291713 A1 | 10/2018 | Jeanson |
| 2018/0298731 A1 | 10/2018 | Bishop |
| 2018/0312738 A1 | 11/2018 | Rutsch et al. |
| 2018/0313677 A1 | 11/2018 | Warren et al. |
| 2018/0320483 A1 | 11/2018 | Zhang |

(56) References Cited

U.S. PATENT DOCUMENTS

| | | |
|---|---|---|
| 2018/0343125 A1 | 11/2018 | Clish |
| 2018/0363437 A1 | 12/2018 | Coli |
| 2019/0003329 A1 | 1/2019 | Morris |
| 2019/0010793 A1 | 1/2019 | Hinderliter |
| 2019/0040727 A1 | 2/2019 | Oehring et al. |
| 2019/0063309 A1 | 2/2019 | Davis |
| 2019/0100989 A1 | 4/2019 | Stewart |
| 2019/0112910 A1 | 4/2019 | Oehring |
| 2019/0119096 A1 | 4/2019 | Haile |
| 2019/0120024 A1 | 4/2019 | Oehring |
| 2019/0128080 A1 | 5/2019 | Ross |
| 2019/0128104 A1 | 5/2019 | Graharn et al. |
| 2019/0145251 A1 | 5/2019 | Johnson |
| 2019/0154020 A1 | 5/2019 | Glass |
| 2019/0162061 A1 | 5/2019 | Stephenson |
| 2019/0169971 A1 | 6/2019 | Oehring |
| 2019/0178057 A1 | 6/2019 | Hunter |
| 2019/0178235 A1 | 6/2019 | Coskrey |
| 2019/0203567 A1 | 7/2019 | Ross |
| 2019/0203572 A1 | 7/2019 | Morris |
| 2019/0211661 A1 | 7/2019 | Reckels |
| 2019/0226317 A1 | 7/2019 | Payne |
| 2019/0245348 A1 | 8/2019 | Hinderliter |
| 2019/0249527 A1 | 8/2019 | Kraynek |
| 2019/0257462 A1 | 8/2019 | Rogers |
| 2019/0292866 A1 | 9/2019 | Ross |
| 2019/0292891 A1 | 9/2019 | Kajaria |
| 2019/0316447 A1 | 10/2019 | Oehring |
| 2020/0047141 A1 | 2/2020 | Oehring et al. |
| 2020/0088152 A1 | 3/2020 | Allion et al. |
| 2020/0232454 A1 | 7/2020 | Chretien |

FOREIGN PATENT DOCUMENTS

| | | |
|---|---|---|
| CA | 2707269 | 12/2010 |
| CA | 2482943 | 5/2011 |
| CA | 3050131 | 11/2011 |
| CA | 2955706 | 10/2012 |
| CA | 2966672 | 10/2012 |
| CA | 3000322 | 4/2013 |
| CA | 2787814 | 2/2014 |
| CA | 2833711 | 5/2014 |
| CA | 2978706 | 9/2016 |
| CA | 2944980 | 2/2017 |
| CA | 3006422 | 6/2017 |
| CA | 3018485 | 8/2017 |
| CA | 2964593 | 10/2017 |
| CA | 2849825 | 7/2018 |
| CA | 3067854 A1 | 1/2019 |
| CA | 2919649 | 2/2019 |
| CA | 2919666 | 7/2019 |
| CA | 2797081 | 9/2019 |
| CA | 2945579 | 10/2019 |
| CN | 201687513 | 12/2010 |
| CN | 101977016 | 2/2011 |
| CN | 202023547 | 11/2011 |
| CN | 102602322 | 7/2012 |
| CN | 104117308 A | 10/2014 |
| CN | 104196613 A | 12/2014 |
| CN | 205986303 U | 2/2017 |
| CN | 108049999 A | 5/2018 |
| CN | 112196508 A | 1/2021 |
| JP | 2004264589 | 9/2004 |
| WO | 2016/144939 | 9/2016 |
| WO | 2016/160458 | 10/2016 |
| WO | 2018044307 A1 | 3/2018 |
| WO | 2018213925 A1 | 11/2018 |

OTHER PUBLICATIONS

Notice of Allowance dated Jan. 9, 2020 in related U.S. Appl. No. 16/570,331.
Non-Final Office Action dated Dec. 23, 2019 in related U.S. Appl. No. 16/597,008.
Non-Final Office Action dated Jan. 10, 2020 in related U.S. Appl. No. 16/597,014.
Non-Final Office Action dated Dec. 6, 2019 in related U.S. Appl. No. 16/564,186.
International Search Report and Written Opinion dated Nov. 26, 2019 in related PCT Application No. PCT/US19/51018.
International Search Report and Written Opinion dated Feb. 11, 2020 in related PCT Application No. PCT/US2019/055323.
Office Action dated Dec. 12, 2018 in related U.S. Appl. No. 16/160,708.
International Search Report and Written Opinion dated Jan. 2, 2019 in related PCT Patent Application No. PCT/US18/54542.
International Search Report and Written Opinion dated Jan. 2, 2019 in related PCT Patent Application No. PCT/US18/54548.
International Search Report and Written Opinion dated Dec. 31, 2018 in related PCT Patent Application No. PCT/US18/55913.
International Search Report and Written Opinion dated Jan. 4, 2019 in related PCT Patent Application No. PCT/US18/57539.
UK Power Networks—Transformers to Supply Heat to Tate Modern—from Press Releases May 16, 2013.
Non-Final Office Action issued in corresponding U.S. Appl. No. 15/293,681 dated Feb. 16, 2017.
Non-Final Office Action issued in corresponding U.S. Appl. No. 15/294,349 dated Mar. 14, 2017.
Final Office Action issued in corresponding U.S. Appl. No. 15/145,491 dated Jan. 20, 2017.
Non-Final Office Action issued in corresponding U.S. Appl. No. 15/145,443 dated Feb. 7, 2017.
Notice of Allowance issued in corresponding U.S. Appl. No. 15/217,040 dated Mar. 28, 2017.
Notice of Allowance issued in corresponding U.S. Appl. No. 14/622,532 dated Mar. 27, 2017.
Non-Final Office Action issued in corresponding U.S. Appl. No. 15/291,842 dated Jan. 6, 2017.
Final Office Action issued in corresponding U.S. Appl. No. 14/622,532 dated Dec. 7, 2016.
Non-Final Office Action issued in corresponding U.S. Appl. No. 14/622,532 dated May 17, 2016.
Final Office Action issued in corresponding U.S. Appl. No. 14/622,532 dated Dec. 21, 2015.
Non-Final Office Action issued in corresponding U.S. Appl. No. 14/622,532 dated Aug. 5, 2015.
Non-Final Office Action issued in corresponding U.S. Appl. No. 15/145,491 dated Sep. 12, 2016.
Non-Final Office Action issued in corresponding U.S. Appl. No. 15/217,040 dated Nov. 29, 2016.
Non-Final Office Action issued in corresponding U.S. Appl. No. 15/235,788 dated Dec. 14, 2016.
Non-Final Office Action issued in corresponding U.S. Appl. No. 15/145,491 dated May 15, 2017.
Non-Final Office Action issued in corresponding U.S. Appl. No. 15/486,970 dated Jun. 22, 2017.
Non-Final Office Action issued in corresponding U.S. Appl. No. 15/487,656 dated Jun. 23, 2017.
Non-Final Office Action issued in corresponding U.S. Appl. No. 15/487,694 dated Jun. 26, 2017.
Final Office Action issued in corresponding U.S. Appl. No. 15/294,349 dated Jul. 6, 2017.
Non-Final Office Action issued in corresponding U.S. Appl. No. 14/884,363 dated Sep. 5, 2017.
Final Office Action issued in corresponding U.S. Appl. No. 15/145,491 dated Sep. 6, 2017.
Non-Final Office Action issued in corresponding U.S. Appl. No. 14/881,535 dated Oct. 6, 2017.
Non-Final Office Action issued in corresponding U.S. Appl. No. 15/145,414 dated Nov. 29, 2017.
Non-Final Office Action issued in corresponding U.S. Appl. No. 15/644,487 dated Nov. 13, 2017.
Canadian Office Action dated Mar. 2, 2018 in related Canadian Patent Application No. 2,833,711.
Office Action dated Apr. 10, 2018 in related U.S. Appl. No. 15/294,349.
Office Action dated Apr. 2, 2018 in related U.S. Appl. No. 15/183,387.

(56) References Cited

OTHER PUBLICATIONS

Office Action dated May 29, 2018 in related U.S. Appl. No. 15/235,716.
Candian Office Action dated Apr. 18, 2018 in related Canadian Patent Application No. 2,928,711.
Canadian Office Action dated Jun. 22, 2018 in related Canadian Patent Application No. 2,886,697.
Office Action dated Jul. 25, 2018 in related U.S. Appl. No. 15/644,487.
Office Action dated Oct. 4, 2018 in related U.S. Appl. No. 15/217,081.
International Search Report and Written Opinion dated Sep. 19, 2018 in related PCT Patent Application No. PCT/US2018/040683.
Canadian Office Action dated Sep. 28, 2018 in related Canadian Patent Application No. 2,945,281.
Non-Final Office Action dated Feb. 12, 2019 in related U.S. Appl. No. 16/170,695.
International Search Report and Written Opinion dated Feb. 15, 2019 in related PCT Application No. PCT/US18/63977.
Non-Final Office Action dated Feb. 25, 2019 in related U.S. Appl. No. 16/210,749.
International Search Report and Written Opinion dated Mar. 5, 2019 in related PCT Application No. PCT/US18/63970.
Non-Final Office Action dated Mar. 6, 2019 in related U.S. Appl. No. 15/183,387.
Office Action dated Mar. 1, 2019 in related Canadian Patent Application No. 2,943,275.
Office Action dated Jan. 30, 2019 in related Canadian Patent Application No. 2,936,997.
International Search Report and Written Opinion dated Apr. 10, 2019 in corresponding PCT Application No. PCT/US2019/016635.
Notice of Allowance dated Apr. 23, 2019 in corresponding U.S. Appl. No. 15/635,028.
Schlumberger, "Jet Manual 23, Fracturing Pump Units, SPF/SPS-343, Version 1.0," Jan. 31, 2007, 68 pages.
Stewart & Stevenson, "Stimulation Systems," 2007, 20 pags.
Luis Gamboa, "Variable Frequency Drives in Oil and Gas Pumping Systems," Dec. 17, 2011, 5 pages.
"Griswold Model 811 Pumps: Installation, Operation and Maintenance Manual, ANSI Process Pump," 2010, 60 pages.
International Search Report and Written Opinion dated Jul. 9, 2019 in corresponding PCT Application No. PCT/US2019/027584.
Office Action dated Jun. 11, 2019 in corresponding U.S. Appl. No. 16/210,749.
Office Action dated May 10, 2019 in corresponding U.S. Appl. No. 16/268,030.
Canadian Office Action dated May 30, 2019 in corresponding CA Application No. 2,833,711.
Canadian Office Action dated Jun. 20, 2019 in corresponding CA Application No. 2,964,597.
Office Action dated Jun. 7, 2019 in corresponding U.S. Appl. No. 16/268,030.
International Search Report and Written Opinion dated Sep. 11, 2019 in related PCT Application No. PCT/US2019/037493.
Office Action dated Aug. 19, 2019 in related U.S. Appl. No. 15/356,436.
Office Action dated Oct. 2, 2019 in related U.S. Appl. No. 16/152,732.
Office Action dated Sep. 11, 2019 in related U.S. Appl. No. 16/268,030.
Office Action dated Oct. 11, 2019 in related U.S. Appl. No. 16/385,070.
Office Action dated Sep. 3, 2019 in related U.S. Appl. No. 15/994,772.
Office Action dated Sep. 20, 2019 in related U.S. Appl. No. 16/443,273.
Canadian Office Action dated Oct. 1, 2019 in related Canadian Patent Application No. 2,936,997.
Non-Final Office Action issued in U.S. Appl. No. 14/881,535 dated May 20, 2020.
Non-Final Office Action issued in U.S. Appl. No. 15/145,443 dated May 8, 2020.
Non-Final Office Action issued in U.S. Appl. No. 16/458,696 dated May 22, 2020.

International Search Report and Written Opinion issued in PCT/US2020/023809 dated Jun. 2, 2020.
Karin, "Duel Fuel Diesel Engines," (2015), Taylor & Francis, pp. 62-63, Retrieved from https://app.knovel.com/hotlink/toc/id:kpDFDE0001/dual-fueal-diesel-enginesiduel-fuel-diesel-engines (Year 2015).
Godwin, "High-voltage auxilliary switchgear for power stations," Power Engineering Journal, 1989, 10 pg. (Year 1989).
Non-Final Office Action dated Mar. 31, 2020 in U.S. Appl. No. 15/356,436.
International Search Report and Written Opinion dated Jun. 2, 2020 in corresponding PCT Application No. PCT/US20/23809.
International Search Report and Written Opinion dated Jun. 23, 2020 in corresponding PCT Application No. PCT/US20/23912.
International Search Report and Written Opinion dated Jul. 22, 2020 in corresponding PCT Application No. PCT/US20/00017.
Office Action dated Aug. 4, 2020 in related U.S. Appl. No. 16/385,070.
Dffice Action dated Jun. 29, 2020 in related U.S. Appl. No. 16/404,283.
Dffice Action dated Jun. 29, 2020 in related U.S. Appl. No. 16/728,359.
Dffice Action dated Jun. 22, 2020 in related U.S. Appl. No. 16/377,861.
Canadian Office Action dated Aug. 18, 2020 in related CA Patent Application No. 2,933,444.
Canadian Office Action dated Aug. 17, 2020 in related CA Patent Application No. 2,944,968.
Morris et al., U.S. Appl. No. 62/526,869; Hydration-Blender Transport and Electric Power Distribution for Fracturing Operation; filed Jun. 28, 2018; USPTO; see entire document.
Final Office Action dated Feb. 4, 2021 in U.S. Appl. No. 16/597,014.
International Search Report and Written Opinion dated Feb. 4, 2021 in PCT/US20/59834.
International Search Report and Written Opinion dated Feb. 2, 2021 in PCT/US20/58906.
International Search Report and Written Opinion dated Feb. 3, 2021 in PCT/US20/58899.
Non-Final Office Action dated Jan. 29, 2021 in U.S. Appl. No. 16/564,185.
Final Office Action dated Jan. 21, 2021 in U.S. Appl. No. 16/458,696.
Final Office Action dated Jan. 11, 2021 in U.S. Appl. No. 16/404,283.
Non-Final Office Action dated Jan. 4, 2021 in U.S. Appl. No. 16/522,043.
International Search Report and Written Opinion dated Dec. 14, 2020 in PCT/US2020/53980.
Non-Final Office dated Oct. 26, 2020 in U.S. Appl. No. 15/356,436.
Non-Final Office dated Oct. 5, 2020 in U.S. Appl. No. 16/443,273.
Non-Final Office Action dated Sep. 29, 2020 in U.S. Appl. No. 16/943,727.
Non-Final Office Action dated Sep. 2, 2020 in U.S. Appl. No. 16/356,263.
Non-Final Office Action dated Aug. 31, 2020 in U.S. Appl. No. No. 16/167,083.
Albone, "Mobile Compressor Stations for Natural Gas Transmission Service," ASME 67-GT-33, Turbo Expo, Power for Land, Sea and Air, vol. 79887, p. 1-10, 1967.
Canadian Office Action dated Sep. 22, 2020 in Canadian Application No. 2,982,974.
International Search Report and Written Opinion dated Sep. 3, 2020 in PCT/US2020/36932.
"Process Burner" (https://www.cebasrt.com/productsloii-gaslprocess-burner) 06 Sep. 6, 2018 (Sep. 6, 2018), entire document, especially para (Burners for refinery Heaters].
Water and Glycol Heating Systems• (https://www.heat-inc.com/wg-series-water-glycol-systems/) Jun. 18, 2018 (Jun. 18, 2018), entire document, especially WG Series Water Glycol Systems.
"Heat Exchanger" (https://en.wikipedia.org/w/index.php?title=Heat_exchanger&oldid=89300146) Apr. 12-18-19, 2019 (Apr. 18. 2019), entire document, especially para (0001].
Canadian Office Action dated Sep. 8, 2020 in Canadian Patent Application No. 2,928,707.
Canadian Office Action dated Aug. 31, 2020 in Canadian Patent Application No. 2,944,980.

(56) References Cited

OTHER PUBLICATIONS

International Search Report and Written Opinion dated Aug. 28, 2020 in PCT/US20/23821.
International Search Report and Written Opinion mailed in PCT/US2O/67526 dated May 6, 2021.
International Search Report and Written Opinion mailed in PCT/US20/67608 dated Mar. 30, 2021.
International Search Report and Written Opinion mailed in PCT/US20/67528 dated Mar. 19, 2021.
International Search Report and Written Opinion mailed in PCT/US20/67146 dated Mar. 29, 2021.
International Search Report and Written Opinion mailed in PCT/US20/67523 dated Mar. 22, 2021.
International Search Report and Written Opinion mailed in PCT/US2020/066543 dated May 11, 2021.

\* cited by examiner

INSTRUMENTED FRACTURING SLURRY FLOW SYSTEM AND METHOD

CROSS REFERENCE TO RELATED APPLICATIONS

This application claims priority to and the benefit of co-pending U.S. Provisional Application Ser. No. 62/568, 716 filed Oct. 5, 2017 titled "INSTRUMENTED FRACTURING SLURRY FLOW SYSTEM AND METHOD," the full disclosure of which is hereby incorporated herein by reference in its entirety for all purposes.

BACKGROUND

With advancements in technology over the past few decades, the ability to reach unconventional sources of hydrocarbons has tremendously increased. Horizontal drilling and hydraulic fracturing are two such ways that new developments in technology have led to hydrocarbon production from previously unreachable shale formations. Hydraulic fracturing (fracturing) operations typically require powering numerous components in order to recover oil and gas resources from the ground. For example, hydraulic fracturing usually includes pumps that inject fracturing fluid down the wellbore, blenders that mix proppant into the fluid, cranes, wireline units, and many other components that all must perform different functions to carry out fracturing operations.

Typically, measuring flow rates throughout the fracturing system, such as at the suction or discharge of pump, is challenging because fracturing pumps move slurry mixtures that are formed from solids, liquids, gases, or a combination thereof. As a result, positioning a probe or flow measuring device encounters difficulties due to the abrasive nature of the slurry as well as the inconsistency of the slurry as it flows into and out of the pumps. Accordingly, operators attempt to calculate the flow rates throughout the system. Because flow rates are not known, it is difficult to monitor the performance of various equipment in the fracturing operation, such as the pumps. Furthermore, monitoring potential wear and tear on the equipment is also challenging. These challenges are present for equipment that is powered traditionally by diesel engines or powered electrically.

SUMMARY

Applicant recognized the problems noted above herein and conceived and developed embodiments of systems and methods, according to the present disclosure, for assessing flow rates in hydraulic fracturing systems.

In an embodiment, a method for monitoring a fracturing operation includes positioning a pump at a well site where fracturing operations are being conducted. The method also includes arranging one or more sensors at least one of a pump inlet or a pump outlet, the one or more sensors monitoring a flow rate of a slurry. The method includes receiving flow data from the one or more sensors. The method also includes determining a pump efficiency, based at least in part on the flow data, is below a threshold. The method further includes adjusting one or more operating parameters of the pump.

In an embodiment, a system for monitoring a hydraulic fracturing operation includes a pump arranged a well site where hydraulic fracturing is to be performed, the pump being fluidly coupled to a slurry supply at a suction end and to discharge piping at a discharge end. The system also includes a first sensor arranged at at least one of the suction end or the discharge end, the first sensor determining a flow rate of the slurry. The system further includes a second sensor arranged proximate the pump to measure one or more operating parameters of the pump. The system also includes a controller communicatively coupled to the pump, the first sensor, and the second sensor, wherein the controller adjusts the one or more operating parameters based at least in part on information received from the first sensor.

In an embodiment, a method for adjusting a pump during a fracturing operation includes receiving first data from a first sensor arranged at a suction side of the pump. The method also includes receiving second data from a second sensor arranged a discharge side of the pump. The method further includes determining a pump efficiency, based at least in part on the first data and the second data. The method also includes comparing the pump efficiency to a threshold, the threshold being a pre-determined value indicative of an operational condition of the pump. The method further includes determining the pump efficiency is below the threshold. The method includes performing an action associated with the pump.

In an embodiment, a pump is diesel powered.
In an embodiment, a pump is electric powered.
In an embodiment, one or more additional sensors monitor pressure.
In an embodiment, one or more additional sensors monitor vibrations.
In an embodiment, one or more additional sensors monitor density.
In an embodiment, the sensors transmit data wireless
In an embodiment, the sensors transmit data through a wired connection.

BRIEF DESCRIPTION OF DRAWINGS

The foregoing aspects, features, and advantage of embodiments of the present disclosure will further be appreciated when considered with reference to the following description of embodiments and accompanying drawings. In describing embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

DETAILED DESCRIPTION

Figure 1:
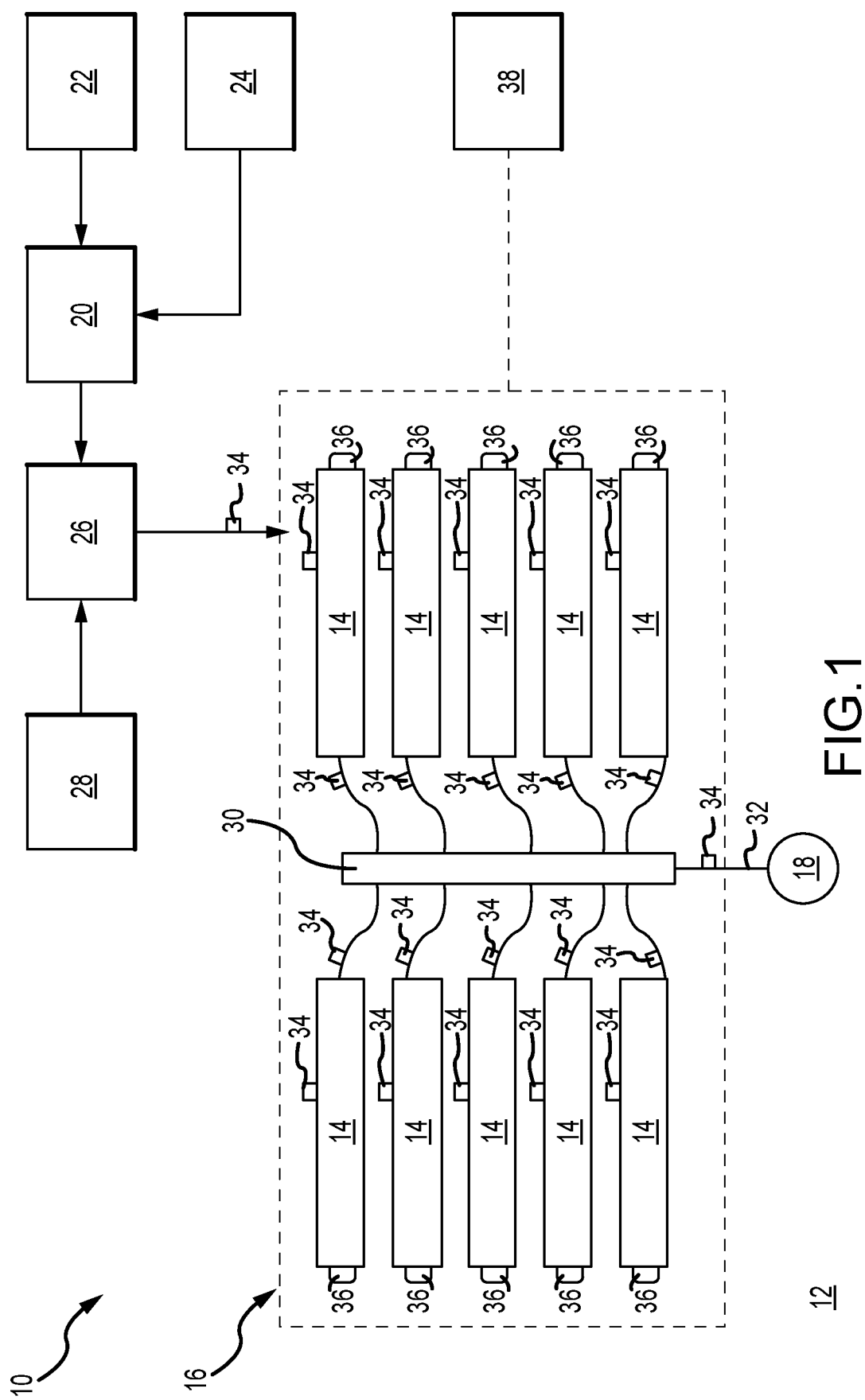
FIG. 1 is a schematic plan view of an embodiment of a fracturing operation, in accordance with embodiments of the present disclosure.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions. Additionally, recitations of steps of a method should be understood as being capable of being performed in any order unless specifically stated otherwise. Furthermore, the steps may be performed in series or in parallel unless specifically stated otherwise.

Embodiments of the present disclosure describe one or more flow sensors arranged on a suction side and/or a discharge side of a pump or group of pumps. The one or more flow sensors monitor the flow rate of a slurry fluid through one or more tubulars without directly contacting the slurry flow, in various embodiments. That is, the one or more sensors monitors the flow of the slurry though the tubular wall. As such, the reliability and longevity of the one or more flow sensors is improved because the flow sensors may not be degraded or otherwise impacted via contact with the slurry. However, in other embodiments, the flow sensors may at least partially be in fluid communication with the slurry. It should be appreciated that the one or more sensors may be located at any position in the system that is upstream and/or downstream of an individual pump or a group of pumps, respectively. For example, the one or more sensors may be located at a pump inlet, a pump outlet, a common pump inlet manifold, a common pump outlet, a combination thereof, or any other reasonable location. The data acquired by the flow sensors may be utilized to adjust the operation of one or more pumps to thereby improve efficiencies of the pumps. For example, based on the data acquired from the one or more sensors, the pump speed or inlet pressures may be adjusted. In certain embodiments, additional sensors may also be utilized to further monitor operating parameters of the pumps, for example, vibration, RPM, pressure, temperature, or the like to monitor for potential operating inefficiencies, such as cavitation. This data may be aggregated, for example on a network server, and utilized to control operations at a well site.

FIG. 1 is a plan schematic view of an embodiment of a hydraulic fracturing system 10 positioned at a well site 12. In the illustrated embodiment, pump trucks 14, which make up a pumping system 16, are used to pressurize a slurry solution for injection into a wellhead 18. A hydration unit 20 receives fluid from a fluid source 22 via a line, such as a tubular, and also receives additives from an additive source 24. In an embodiment, the fluid is water and the additives are mixed together and transferred to a blender unit 26 where proppant from a proppant source 28 may be added to form the slurry solution (e.g., fracturing slurry) which is transferred to the pumping system 16. The pump trucks 14 may receive the slurry solution at a first pressure (e.g., 80 psi to 100 psi) and boost the pressure to around 15,000 psi for injection into the wellhead 18. In certain embodiments, the pump trucks 14 are powered by electric motors.

After being discharged from the pump system 16, a distribution system 30, such as a missile, receives the slurry solution for injection into the wellhead 18. The distribution system 30 consolidates the slurry solution from each of the pump trucks 14 (for example, via common manifold for distribution of fluid to the pumps) and includes discharge piping 32 (which may be a series of discharge lines or a single discharge line) coupled to the wellhead 18. In this manner, pressurized solution for hydraulic fracturing may be injected into the wellhead 18.

In the illustrated embodiment, one or more sensors 34 are arranged throughout the hydraulic fracturing system 10. As will be described in detail below, the sensors 34 may be utilized to measure a slurry solution flow rate throughout the system 10. In various embodiments, the sensors 34 may be arranged upstream of suction locations of the pumps of the pump trucks 14 and/or downstream of the discharge location of the pumps of the pump trucks 14. However, it should be appreciated that other sensors 36, such as vibration sensors, pressure sensors, temperature sensors, or the like, may also be distributed throughout the system. In embodiments, the sensors 34 transmit flow data to a data van 38 for collection and analysis, among other things.

Figure 2:
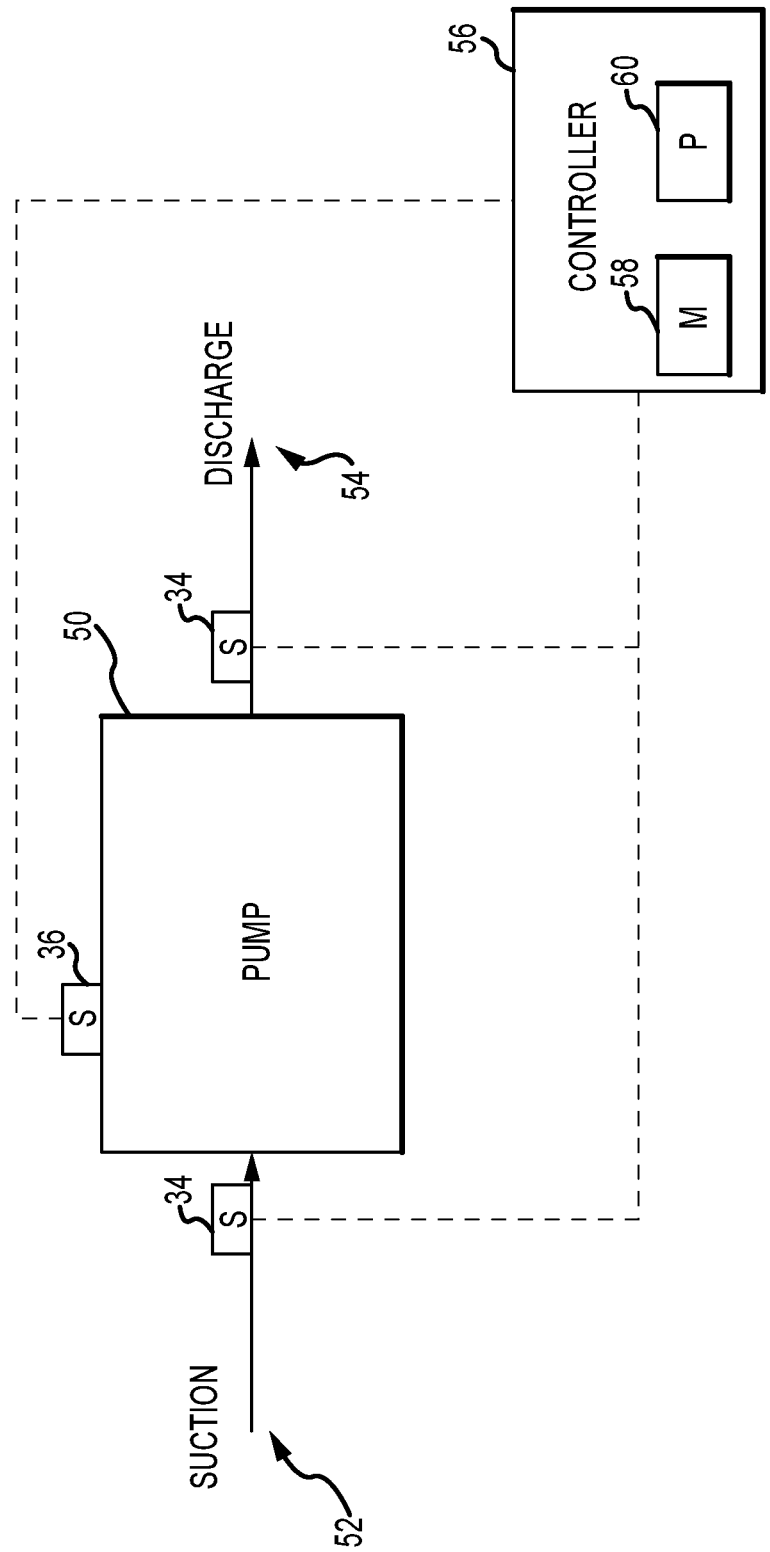
FIG. 2 is a schematic diagram of an embodiment of a pump and a controller, in accordance with embodiments of the present disclosure.

FIG. 2 is a block diagram of an embodiment of a pump 50 of the pump trucks 14 including sensors 34 arranged at a suction side 52 and a discharge side 54. It should be appreciated that while the illustrated embodiment includes the sensors 34 proximate the pump 50, in other embodiments the sensors 34 may be arranged along any portion of either the suction of discharge sides 52, 54 of the pump. For instance, the sensors 34 may be arranged downstream of the blender unit 26 or at any other reasonable location on the suction side 52 of the pump 50. Furthermore, the sensors 34 may further be arranged at any reasonable location on the discharge side 54 of the pump, such as on the distribution system 30 (for example, at a common manifold), the discharge piping 32, or the like. Additionally, it should be appreciated that groups or banks of pumps may share sensors 34. That is, the sensors 34 may be arranged at a manifold directing fluid to a group of pumps and/or at an outlet that collects fluid from a group of pumps. Also, as illustrated, individual pumps 50 may have dedicated sensors 34. The illustrated pump 50 further includes the sensor 36. In embodiments, the sensor 36 measures vibration (which may be determined by acceleration, frequency, or the like) of the pump 50, which may be utilized to monitor for potential cavitation or other pump related issues. Furthermore, the sensor 36 may be arranged at any location on the suction or discharge sides 52, 54 of the pump to monitor other properties of the fracturing system, such as pressure, temperature, or the like.

The embodiment illustrated in FIG. 2 also includes a controller 56 having a memory 58 and a processor 60. It should be appreciated that the memory 58 may be any type of non-transitory machine readable medium, such as a solid state drive or magnetic hard drive, among other options. Moreover, the memory 58 may store one or more programs having executable instructions that, when executed by the processor 60, cause the processor run the programs. As illustrated, data from the sensors 34, 36 is communicatively transmitted to the controller 56, for example via a wired or wireless communication (e.g., Wi-Fi, cellular networks, universal serial bus, etc.). As will be described below, the controller 56 may be utilized to store and monitor data to detect inefficiencies in the pumping system 16, for example loss of efficiencies at the pump 50. This loss of efficiency may also be referred to as a damage threshold that indicates certain damage, which may lead to reduced pumping efficiencies. For example, the slurry may impinge on the pump impellers and cause pitting or misalignment. By way of example, in various embodiments, cavitation may damage the impeller or pump housing. This loss of efficiency may be indicative of a potential maintenance event that may be identified and scheduled before the pump becomes inoperable. Additionally, the controller 56 may monitor the flow rate into and out of the pump 50 to regulate and control pumping operations. For example, the controller 56 may detect a variance in the suction side 52 flow rate of one or more pumps 50 in the pumping system 16. Accordingly, adjustments may be initiated, such as throttling valves, pump maintenance, or the like, to improve the efficiency of the pumping operation. In certain embodiments, based on the data received from the sensors 34, 36, the controller 56 may transmit a signal to one or more pumps 50 to adjust operation of the pump 50, such as increasing a pump speed, adjusting discharge or suction pressures, or the like. In this manner, pumping operations may be monitored and controlled utilizing one or more of the sensors 34, 36.

In the illustrated embodiment, there are the sensors 34 arranged on each side of the pump 50. That is, there are sensors 34 monitoring both the suction side 52 and the discharge side 54. This arrangement enables the controller 56 to monitor the efficiency of the pump, which may be calculated in a variety of methods but in certain embodiments is a ratio of the suction flow rate to the discharge flow rate. Where the suction flow rate is significantly higher than the discharge flow rate (e.g., by a threshold amount) there is an indication of efficiency losses across the pump 50. However, it should be appreciated that in other embodiments more of fewer sensors may be utilized. Moreover, in embodiments there may be sensors 34 on only the suction side 52 or only the discharge side 54.

Figure 3:
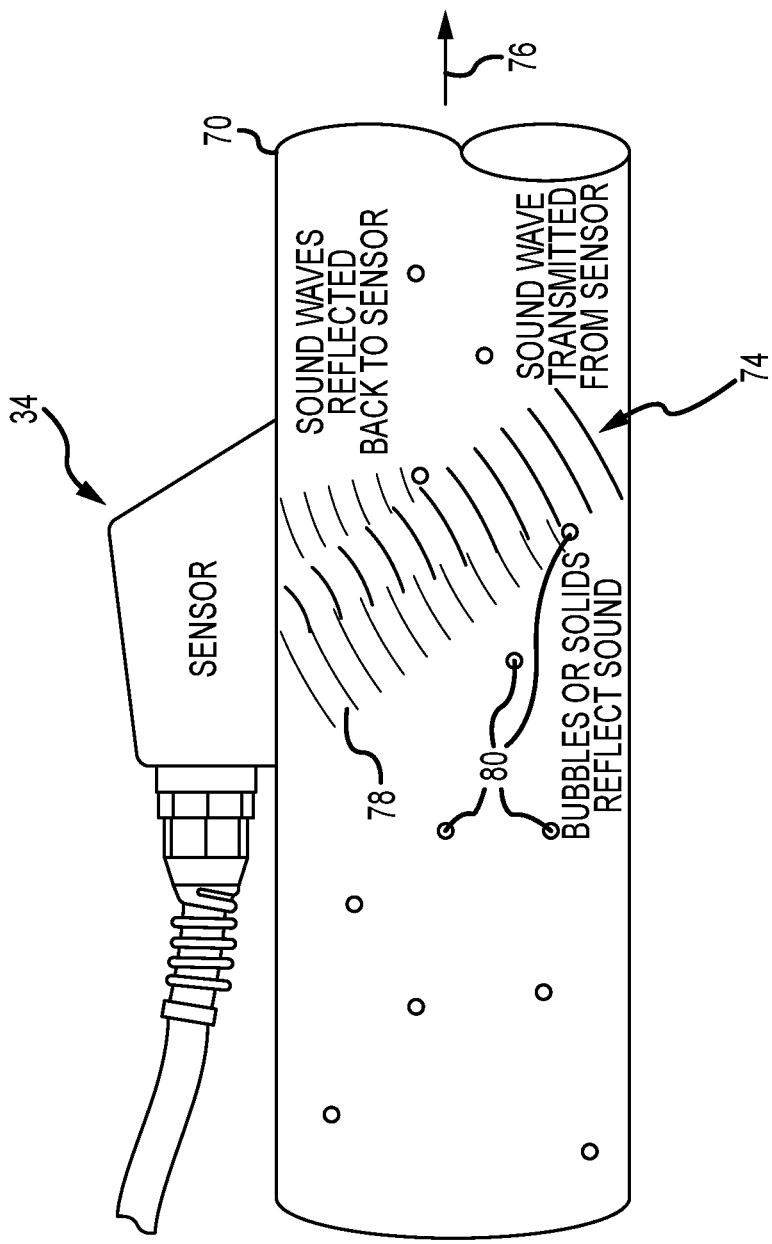
FIG. 3 is a side elevational schematic diagram of an embodiment of a sensor in the form of a Doppler effect sensor, in accordance with embodiments of the present disclosure.

FIG. 3 is a schematic of an embodiment of the sensor 34. In the illustrated embodiment, the sensor 34 is a Doppler flow meter (e.g., ultrasonic flow meter). In operation, the Doppler flow meter transmits sound waves through a tubular 70 (such as the piping on the suction or discharge sides 52, 54 of the pump 50). The sound waves reflect back to the sensor 34 as they contact the particles in the slurry, thereby providing an indication of the flow rate through the tubular. For example, the sensor 34 may include a transmitter that transmits a soundwave 74 signal into a flow path 76 and a receiver that receives and/or detects a frequency shifted return soundwave 78 (based on the reflection via interaction with particulates 80 in the flow). Advantageously, embodiments that utilize the illustrated Doppler flow meter are not in contact with the slurry solution, which may be abrasive and damage other sensor tools, such as rods, that are inserted directly into the flow. Accordingly, the longevity of the sensors may be improved. Additionally, the Doppler flow meters may be easier to install because access points will not be drilled into the tubular, for example to insert a probe, and flow meter spools may not be utilized either, which form leak points due to the inclusion of flanges.

It should be appreciated that while FIG. 3 illustrates the Doppler flow meter, in various other embodiment different flow meters may be utilized. These flow meters may be non-contact flow meters or may contact the slurry flow. Examples of other non-contact flow meters include electromagnetic flow meters, radar flow meters, mass flow meters (e.g., Coriolis flow meters), laser flow meters, and the like. Furthermore, in embodiments, contact flow meters may also be utilized. Examples of contact flow meters include turbine flow meters, variable area flow meters, paddle wheels flow meters, positive displacement flow meters, and the like. Accordingly, while in various embodiment thru-pipe sensing may be discussed and utilized, in other embodiments contact flow meters may also be used.

Figure 4:
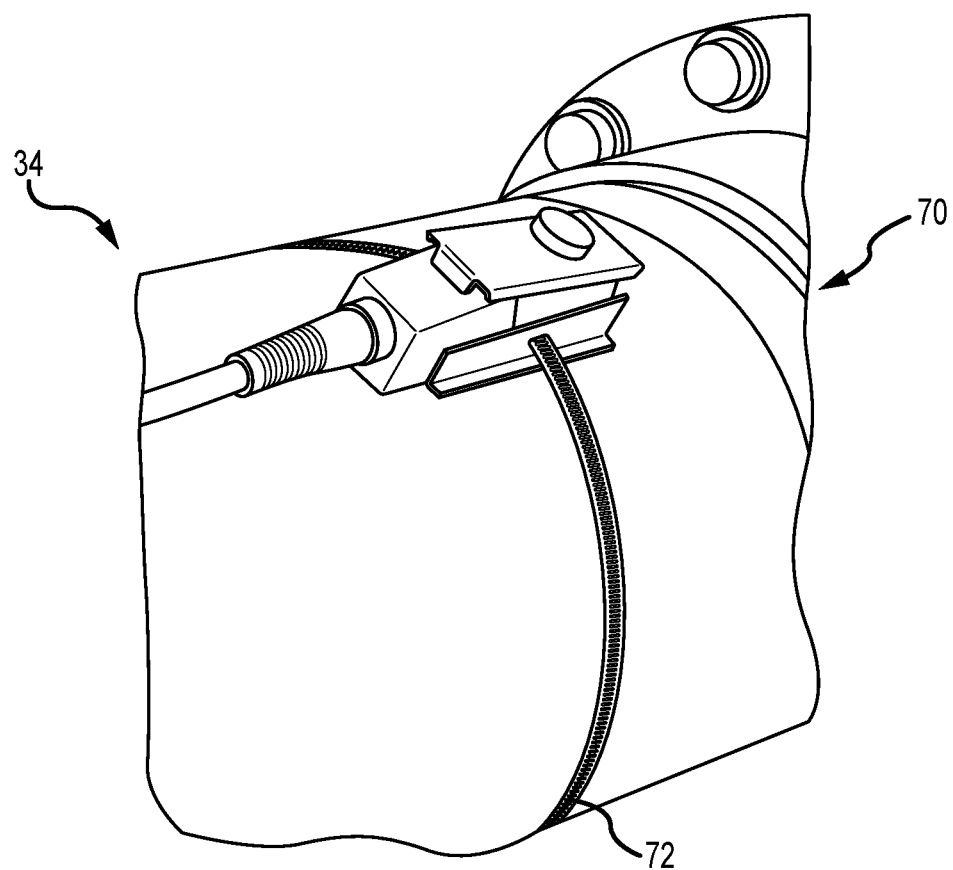
FIG. 4 is an isometric view of an embodiment of the sensor of FIG. 3, in accordance with embodiments of the present disclosure.

FIG. 4 is an isometric view of an embodiment of the sensor 34 arranged on the tubular 70. As described above, the tubular 70 may be any portion of the hydraulic fracturing system 10 arranged either upstream of downstream of the pumps 50 that transmits a fluid flow. In the illustrated embodiment, the sensor 34 is the Doppler flow meter that is secured to the tubular 70 via a strap 72. In other embodiments, different methods to secure the sensor 34 may be utilized, for example a compound or adhesive that facilitates the transmission of soundwaves into the tubular 70. Arranging the sensor 34 on the outside of the tubular 70, e.g., out of the flow stream, removes sensitive components from the abrasive slurry solution flow. Additionally, the sensor 34 may be easily removed for maintenance or moved to a different location.

Figure 5:
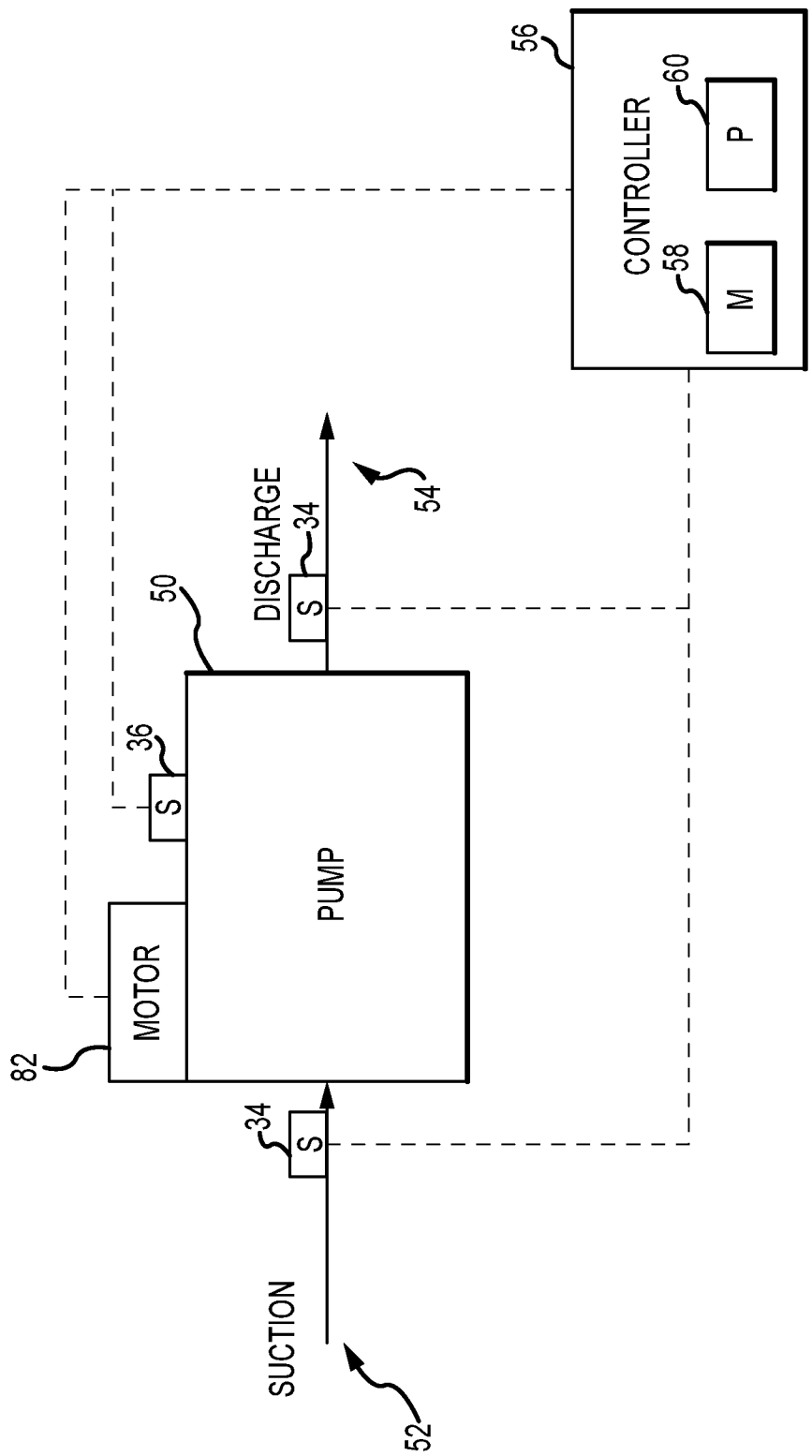
FIG. 5 is a schematic diagram of an embodiment of a pump and a controller, in accordance with embodiments of the present disclosure.

FIG. 5 is a schematic diagram of an embodiment of the pump 50 having a motor 82 communicatively coupled to the controller 56. As described above, data from the sensors 34, 36 is transmitted to the controller 56 for analysis. For example, the controller 56 may determine the difference between an outlet flow rate and an inlet flow rate is greater than a threshold and thereby initiates corrective measures, such as adjusting the speed of the pump 50 via the motor 80. In this manner, data acquisition from the sensors 34, 36 may be utilized to adjust operating parameters in real or near-real time (e.g., without significant delay). In certain embodiments, this process may be automated. In other embodiments, the controller 56 may include one or more displays to transmit operating parameters to an operator to manually adjust the pump 50. Furthermore, the controller 56 may monitor an efficiency of the pump 50 over time and predict when maintenance operations may be scheduled. For example, as efficiency decreases the controller 56 may determine that maintenance operations may be helpful in returning the pump 50 to a previous operating efficiency.

In certain embodiments, the controller 56 may be used to monitor the pumps against a damage threshold. In various embodiments, the damage threshold may correspond to a minimum operating condition for one or more operating parameters. For example, in certain embodiments, a speed of the pump may be used at the operating parameter. There may be a minimum pump speed that corresponds to the damage threshold. If the pump speed drops below the damage threshold, the controller 56 may transmit a signal, for example to an operator, indicative of the operating parameter being below the damage threshold. In various embodiments, the operating parameter being below the damage threshold may trigger a maintenance operator. However, in certain embodiments, remediation attempts may be triggered in order to increase the longevity of the pump and/or to determine whether one or more different parameters may be adjusted to overcome the damage threshold. For example, in the example of a decreased pump speed, the operator may increase a suction or discharge pressure of the pump, which may adjust the speed above the damage threshold. It should be appreciated that the adjustments may be tailored so as to not drop below a different damage threshold associated with a different operating parameter. For example, reducing the suction pressure below a suction pressure damage threshold would be undesirable. Accordingly, adjustments to operating parameters may be performed without triggering further adjustments due to changes related to respective damage thresholds. It should be appreciated that different sets of pumps may have different damage thresholds, which may be stored in a database, and in certain embodiments, may be determined based on prior use in the field and updated as additional operations are performed.

Figure 6:
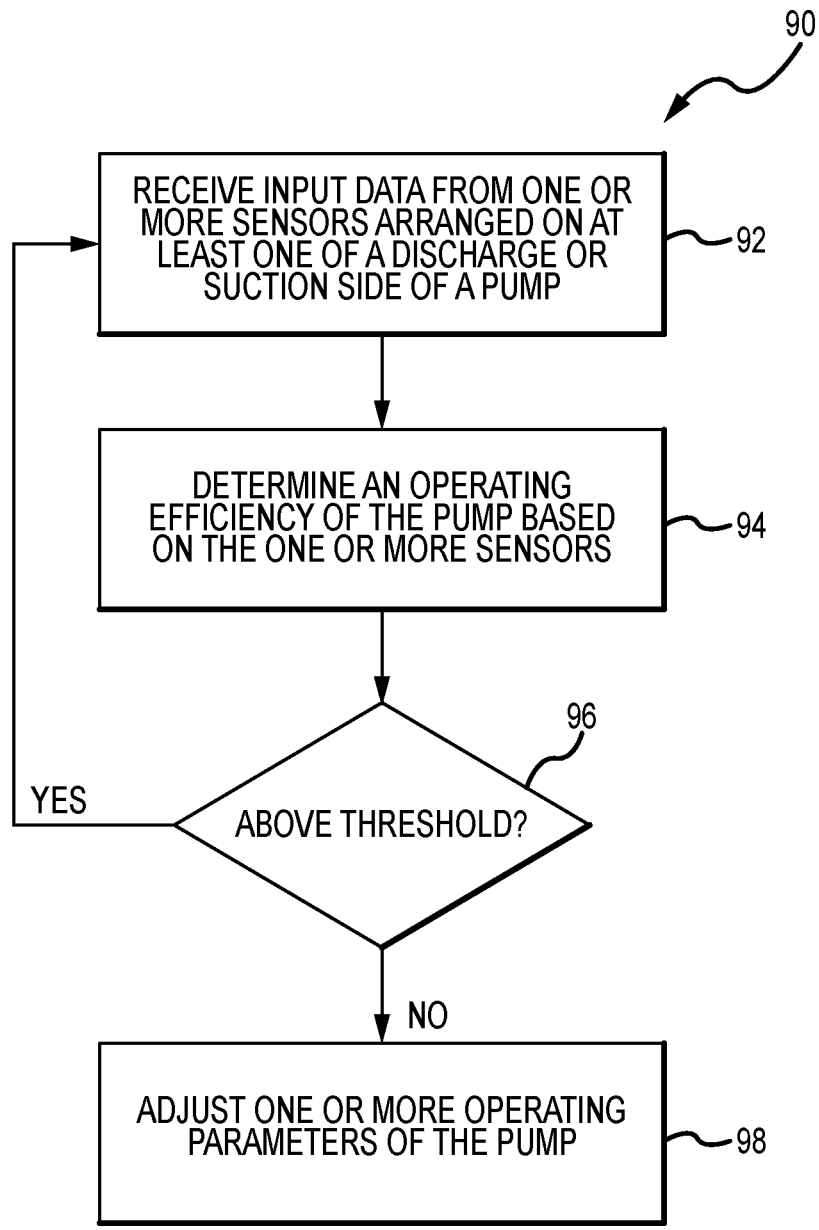
FIG. 6 is a flow chart of an embodiment of a method for monitoring a pump in a fracturing operation, in accordance with embodiments of the present disclosure.

FIG. 6 is a block diagram of an embodiment of a method 90 for adjusting one or more pump operating conditions. It should be appreciated that for this method, and any other method described herein, that the steps may be performed in a different order or in parallel, unless otherwise specifically indicated. Furthermore, more or fewer steps may be included within the method. The method 90 may be utilized to measure an inlet and outlet flow rate of the pump 50, compare the difference, evaluate the difference against a threshold, and undergo correcting steps when the difference is below the threshold. Input data from one or more sensors 34 arranged on at least one of the suction side 52 or the discharge side 54 of the pump 50 is received by the controller 56 (block 92). As described above, the sensors 34 may be at the inlet or outlet of the pump, or at other positions along the pumping system 16. Furthermore, multiple inputs (for example from other sensors 36) may be received to thereby also include features such as line loss or other flow properties into the calculation. Thereafter, the controller 56 determines an operating efficiency of the pump 50 based on the one or more sensors 34 (block 94). The efficiency may be calculated in a variety of ways, such as a difference between the input flow rate and the output flow rate, a ratio, or any other reasonable calculation. Then the efficiency calculation is evaluated against a threshold (operator 96). The threshold may be a predetermined value that indicates the pump 50 is not operating at a sufficient efficiency. For example, the efficiency may be determined based on previous operations or based on one or more properties of the pumps. If the calculated efficiency is below the threshold (e.g., the pump is operating below a desired or predetermined efficiency) then one or more adjustments may be made to the pump 50 (block 98). For example, the motor speed may be adjusted, inlet or outlet pressures may be adjusted, a flow rate toward the pump 50 may be adjusted, or the like. If the calculated efficiency is above the threshold (e.g., the pump is operating above a desired or predetermined efficiency) then the controller 56 continues to monitor input data from the sensors 34. In this manner, continuous monitoring of the pumping system 16 may be utilized. It should be appreciated that while the method 90 is described with reference to a pump, in other embodiments multiple pumps within the pumping system 16 may be monitored and evaluated. For instance, the sensors 34 may be arranged at the inlet and/or outlet of a pump group comprising more than one pump. Accordingly, the efficiency over the group of pumps may be monitored. Or, in embodiments, each pump in the group may be monitored individually. In this manner, operating parameters of the pumps 50 may be continuously monitored to improve efficiencies at the well site.

Figure 7:
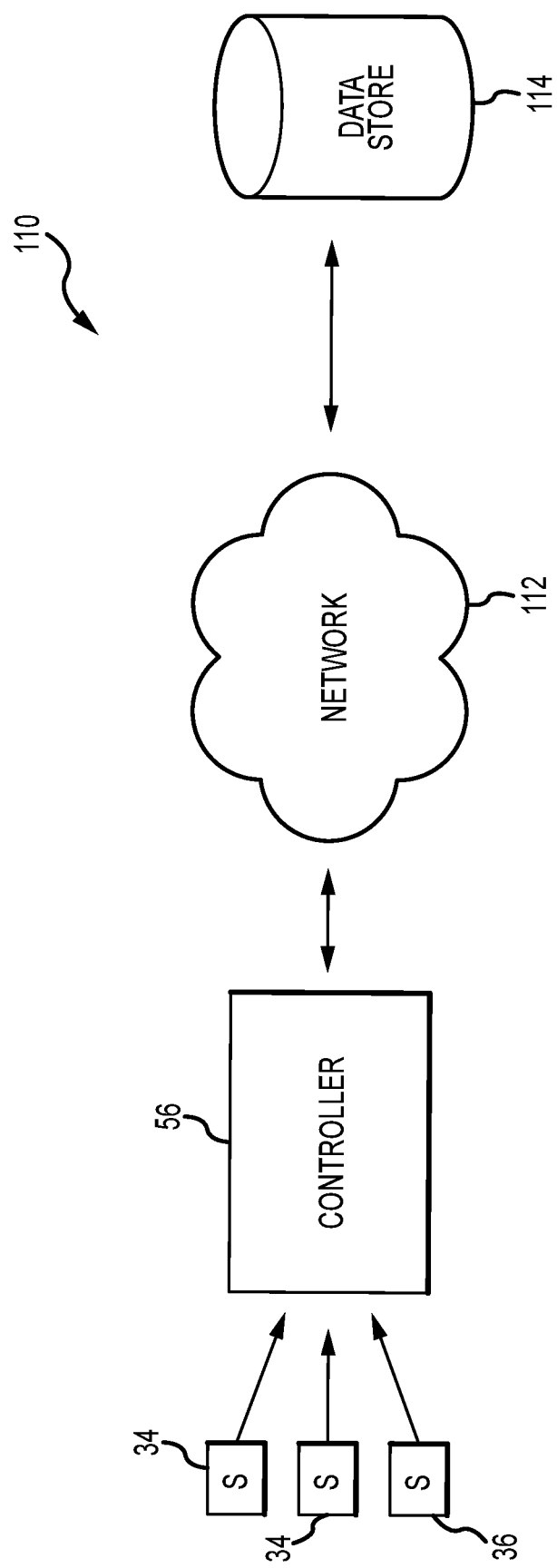
FIG. 7 is a block diagram of an embodiment of a control system, in accordance with embodiments of the present disclosure.

FIG. 7 is a block diagram of an embodiment of a control system 110 for receiving, analyzing, and storing information from the well site 12. As described above, the sensors 34, 36 arranged at the well site 12 may transmit data to the controller 56 for evaluation and potential adjustments to operating parameters of equipment at the well site 12. The controller 56 may be communicatively coupled to a network 112, such as the Internet, that can access a data store 114, such as a cloud storage server. Accordingly, in embodiments, data from the sensors 34, 36 is transmitted to the controller 56 (which may be located within the data van 38) and is stored locally. However, the controller 56 may upload the data from the sensors 34, 36, along with other data, to the data store 114 via the network 112. Accordingly, data from previous pumping operations or different sensors may be utilized to adjust the flow system as needed. For example, the flow data from the sensor 34 may be coupled with information from the sensors 36 (such as the vibration sensor, gear sensors, RPM sensors, pressure sensors, etc.) to provide diagnostics with information from the data store 114. In embodiments, the data store 114 includes information of the equipment used at the well site 12, such as the pumps. The information may include data related to the pumps such as the last time since the pump was serviced or additional information. This data may be combined with the data acquired from the sensors 34, 36 and the efficiency calculations to identify pumps that are candidates for maintenance. For example, a first pump may have a reduced efficiency and also be close to a scheduled maintenance period. Accordingly, the controller 56 may determine the efficiency is below a desired amount and also pull information from the data store 114 indicating maintenance may be needed. Accordingly, the controller 56 may transmit the information to one or more operators that may take the pump offline. If the first pump is part of a pump group then the other sensors 34 may be utilized to monitor the other pumps in the group after removal of the first pump to adjust flow rates to optimize their operation. In this manner, operations at the well site 12 may continue without significant interruption because the first pump can be identified and pulled from service before a failure that may disrupt operations. It should be appreciated that, in various embodiments, information from the data store 114 may be stored in local storage, for example in storage within the data can 38, and as a result, communication over the network 112 to the remote data store 114 may not be used. For example, in various embodiments, drilling operations may be conducted at remote locations where Internet data transmission may be slow or unreliable. As a result, information from the data store 114 may be downloaded and stored locally at the data van 38 before the operation, thereby providing access to the information for evaluation of operation conditions at the well site 12.

Figure 8:
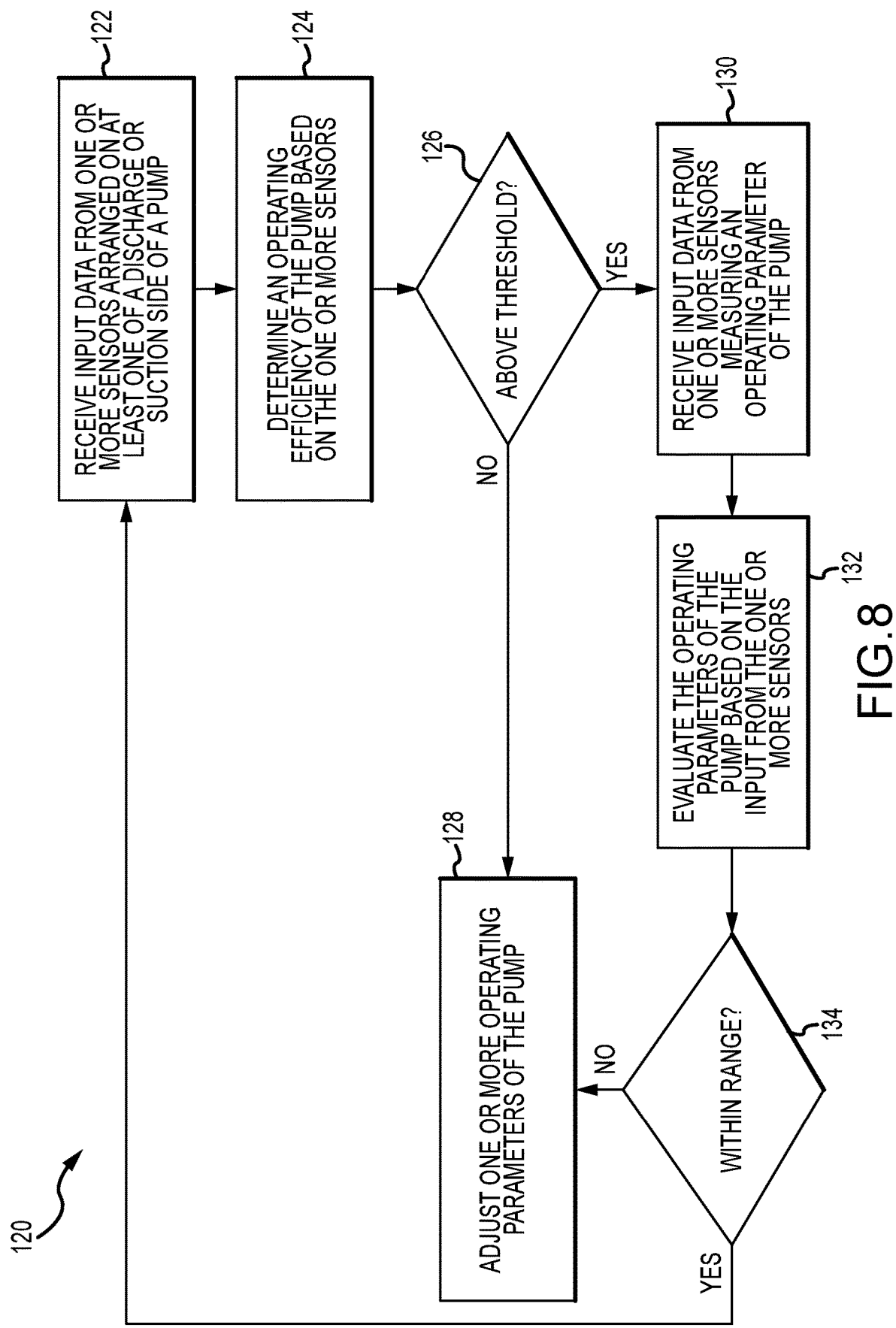
FIG. 8 is a flow chart of an embodiment of a method for monitoring a pump in a fracturing operation, in accordance with embodiments of the present disclosure.

FIG. 8 is a flow chart of an embodiment of a method 120 for monitoring operating conditions of one or more pumps 50. The method 120 may be utilized to measure an inlet and outlet flow rate of the pump 50, compare the difference, evaluate the difference against threshold, evaluate other operating parameters of the pump 50, and undergo correcting steps when the efficiency or operating parameters are outside of a desired operating range. Input data from one or more sensors 34 arranged on at least one of the suction side 52 or the discharge side 54 of the pump 50 is received by the controller 56 (block 122). As described above, the sensors 34 may be at the inlet or outlet of the pump, or at other positions along the pumping system 16. Furthermore, multiple inputs may be received to thereby also include features such as line loss or other flow properties into the calculation. Thereafter, the controller 56 determines an operating efficiency of the pump 50 based on the one or more sensors 34 (block 124). The efficiency may be calculated in a variety of ways, such as a difference between the input flow rate and the output flow rate and the like as described above. Then the efficiency is evaluated against a threshold (operator 126). The threshold may be a predetermined value that indicates the pump 50 is not operating at a sufficient or desired efficiency. As described above, in various embodiments, a desired efficiency may be predetermined, for example, based on operating conditions at the well site and/or previous operating conditions. If the efficiency is below the threshold (e.g., the pump is operating below a desired or predetermined efficiency) then one or more adjustments may be made to the pump 50 (block 128). For example, the motor speed may be adjusted or a flow rate toward the pump 50 may be adjusted. If the calculated efficiency is above the threshold (e.g., the pump is operating above a desired or predetermined efficiency) then the controller 56 receives input from one or more sensors 36 that measure one or more operating parameters of the pump (block 130). For example, the sensors 36 may measure the vibration, RPM, pressures, or the like. The data is compared against a range for the respective operating parameters (132). This range may be predetermined based on desired operating conditions of the pump. Additionally, the range may be acquired from the data store 114 based on previous operating conditions of the pump. If the operating conditions are within the range, then the method 120 returns to monitoring the flow rates. If the operating conditions are outside of the range, then one or more adjustments may be made to the pump 50 (block 128), as described above. In this manner, flow rates determined by the sensor 34 may be coupled with other information from the sensors 36 to effectively manage flow rates and operating conditions at the well site 12.

Figure 9:
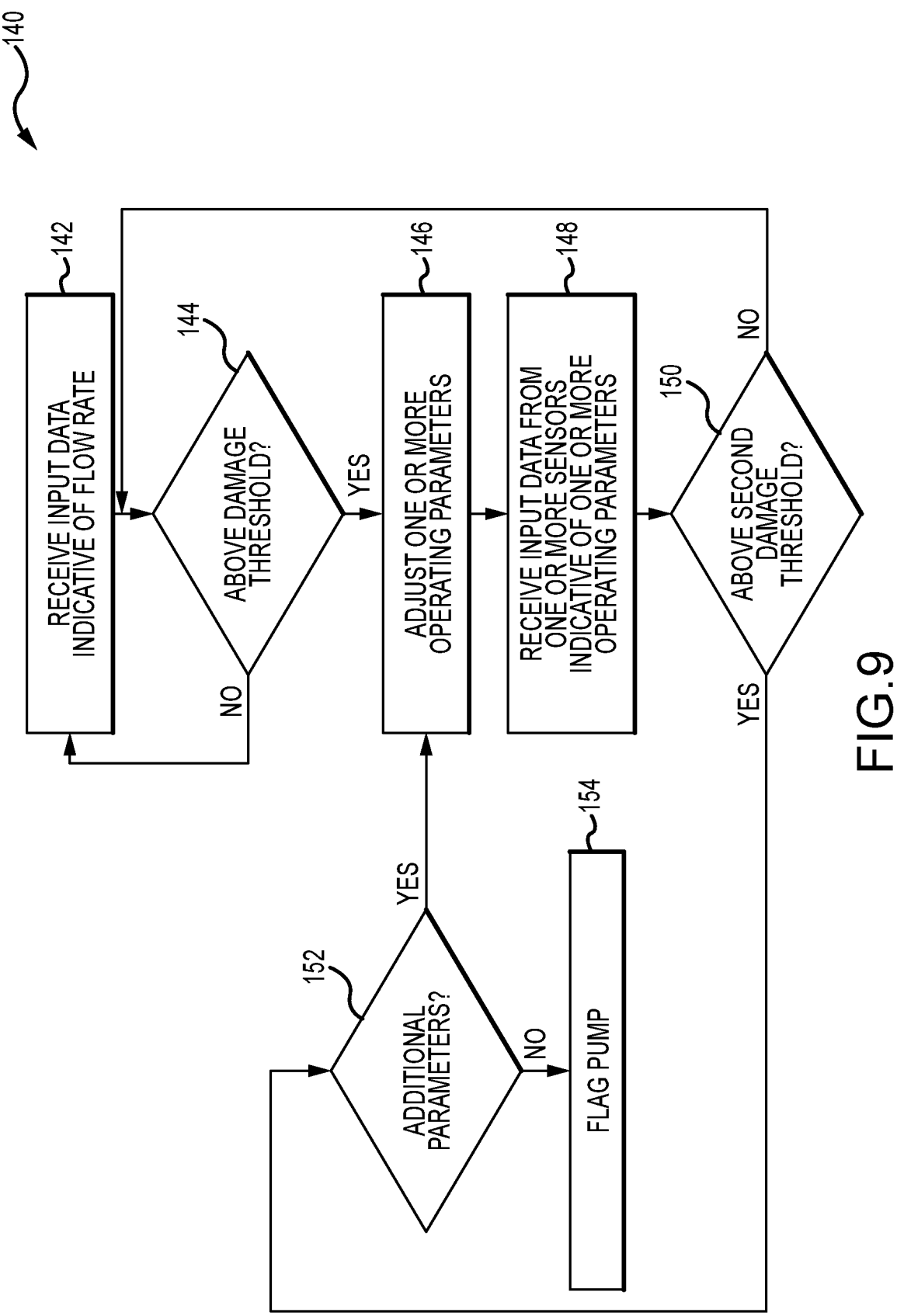
FIG. 9 is a flow chart of an embodiment of a method for monitoring a pump in a fracturing operation, in accordance with embodiments of the present disclosure.

FIG. 9 is a flow chart of an embodiment of a method 140 for monitoring operating conditions of one or more pumps 50. In various embodiments, the method 140 may include monitoring one or more operating parameters of the pump, comparing the operating parameters against a damage threshold, adjusting one or more parameters of the pump when the damage threshold is exceeded, determining whether the adjustments cause one or more different operating parameters to exceed a damage threshold, and transmitting a signal indicative of the operating parameters of the pump and/or instructions for further use of the pump. In this example, input data indicative of a flow rate is received (block 142). For example, the flow rate at a pump inlet or a pump outlet may be received for evaluation. In various embodiments, as described above, the flow rate may be indicative of one or more operating conditions of the pump, such as a normal or desired operating condition or a maintenance required operating condition. In the illustrated embodiment, the flow rate is compared against a damage threshold (operator 144). The damage threshold may be a pre-determined value indicative of an expected operating condition of the pump. In various embodiments, the damage threshold may be indicative of pump damage (e.g., cavitation, alignment, etc.) and may be based, at least in part, on data from previous pumping operations. If the flow rate is below the damage threshold, the method returns to the receiving input data, thereby enabling continuous monitoring. If the flow rate is above the damage threshold, then one or more parameters are adjusted (block 146). Additional sensors may provide input data indicative of the one or more parameters that were adjusted (block 148). For example, if an inlet pressure was adjusted then a pressure transducer may provide information indicative of an outlet pressure after the adjustment. In other words, different operating parameters associated with the pump may be evaluated after the adjustment to determine whether the adjustment has caused any of the additional operating parameters to exceed a second damage threshold (operator 150). If not, then the method returns to operator 144 to determine whether the flow rate exceeds the damage threshold. If so, then additional parameters that may be adjusted are evaluated (operator 152). If there are additional operating parameters to adjust, then the method returns to adjust those parameters. If not, then the pump is flagged (block 154), which may be an indication that the pump may be scheduled for maintenance or taken offline. Accordingly, various operating parameters may be adjusted and compared against damage thresholds to monitor a health and operational functionality of one or more pumps.

The foregoing disclosure and description of the disclosed embodiments is illustrative and explanatory of the embodiments of the invention. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. A method for monitoring a fracturing operation, comprising:
    positioning a pump at a well site where fracturing operations are being conducted;
    arranging one or more flow sensors at at least one of a pump inlet or a pump outlet, the one or more flow sensors monitoring a flow rate of a slurry;
    arranging one or more pump sensors on the pump or a component associated with a pumping system;
    receiving flow data from the one or more flow sensors;
    receiving pump operating data from the one or more pump sensors, the pump operating data being different from the flow data;
    determining a pump efficiency, based at least in part on the flow data and the pump operating data, is below a threshold;
    determining one or more operating parameters of the pump for adjustment;
    determining an adjustment for the one or more operating parameters of the pump;
    determining the one or more operating parameters, after the adjustment is applied, are within a range; and
    adjusting the one or more operating parameters of the pump.

2. The method of claim 1, further comprising:
    determining the one or more operating parameters, after the adjustment is applied, exceed the range; and
    providing an alert.

3. The method of claim 1, further comprising:
receiving second flow data from the one or more flow sensors, after the one or more operating parameters are adjusted; and
determining a second pump efficiency.

4. The method of claim 3, further comprising:
determining the second pump efficiency is above the threshold; and
storing the one or more adjusted operating parameters of the pump.

5. The method of claim 1, wherein the one or more flow sensors are non-contact sensors arranged exterior of a tubular transporting the slurry.

6. The method of claim 5, wherein the non-contact sensors are Doppler effect flow meters, electromagnetic flow meters, radar flow meters, mass flow meters, laser flow meters, or a combination thereof.

7. The method of claim 1, wherein the one or more operating parameters of the pump include a speed, a suction pressure, a discharge pressure, a vibration level, or a combination thereof.

8. A method for adjusting a pump during a fracturing operation, comprising:
receiving first data from a first sensor arranged at a suction side of the pump;
receiving second data from a second sensor arranged at a discharge side of the pump;
determining a pump efficiency, based at least in part on the first data and the second data;
comparing the pump efficiency to a threshold, the threshold being a pre-determined value indicative of an operational condition of the pump;
determining the pump efficiency is below the threshold;
adjusting one or more operating parameters of the pump;
receiving third data from a third sensor arranged on the pump; and
determining a damage threshold, for the pump, is below a pre-determined limit, based at least in part on the third data.

9. The method of claim 8, wherein adjusting one or more operating parameters of the pump comprises:
adjusting a speed of the pump;
adjusting a discharge pressure of the pump;
adjusting a suction pressure of the pump; or
adjusting a pump motor operating parameter.

10. The method of claim 8, further comprising:
receiving fourth data from the third sensor arranged on the pump;
determining the damage threshold exceeds the pre-determined limit; and
taking the pump offline.

11. The method of claim 8, further comprising:
recording the adjusted one or more operating parameters of the pump; and
using the recorded adjusted one or more operating parameters of the pump on a second pump.

12. The method of claim 8, further comprising:
associating the first data with a first damage threshold;
associating the second data with a second damage threshold; and
determining at least one of the first data or the second data exceeds the respective first or second damage thresholds; and
adjusting one or more operating parameters of the pump.

13. The method of claim 8, wherein the first sensor and the second sensor are arranged proximate the pump such that no intermediate equipment is positioned between the first sensor and a pump inlet and no intermediate equipment is positioned between the second sensor and a pump outlet.

* * * * *